(12) United States Patent
Liao et al.

(10) Patent No.: US 11,001,339 B2
(45) Date of Patent: May 11, 2021

(54) BICYCLE REAR DERAILLEUR

(71) Applicant: TEKTRO TECHNOLOGY CORPORATION, Changhua County (TW)

(72) Inventors: Bo-Yi Liao, Changhua County (TW); Yu-Ming Huang, Changhua County (TW); Pei-Hsuan Hung, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 395 days.

(21) Appl. No.: 16/167,721

(22) Filed: Oct. 23, 2018

(65) Prior Publication Data

US 2020/0062344 A1 Feb. 27, 2020

(30) Foreign Application Priority Data

Aug. 22, 2018 (TW) .................................. 107129254

(51) Int. Cl.
*B62M 9/1244* (2010.01)
*B62M 9/126* (2010.01)

(52) U.S. Cl.
CPC .......... *B62M 9/1244* (2013.01); *B62M 9/126* (2013.01)

(58) Field of Classification Search
CPC .............................. B62M 9/126; B62M 9/121
USPC ..................................................... 474/80, 82
See application file for complete search history.

(56) References Cited

U.S. PATENT DOCUMENTS

| | | | | |
|---|---|---|---|---|
| 7,722,488 B2* | 5/2010 | Kunisawa | ............... | B62M 9/126 474/82 |
| 8,852,041 B2* | 10/2014 | Yamaguchi | ............ | B62M 9/126 474/80 |
| 8,870,692 B2* | 10/2014 | Yamaguchi | ............ | B62M 9/126 474/80 |
| 8,870,693 B2* | 10/2014 | Shahana | ................ | B62M 9/121 474/80 |
| 9,039,551 B2* | 5/2015 | Bohm | .................. | B62M 9/1244 474/80 |
| 10,486,769 B2* | 11/2019 | Bernardele | .......... | B62M 9/1244 |
| 2008/0081716 A1* | 4/2008 | Watarai | .................. | B62M 9/125 474/80 |
| 2008/0125259 A1* | 5/2008 | Kunisawa | .............. | B62M 9/121 474/82 |

(Continued)

*Primary Examiner* — Henry Y Liu
(74) *Attorney, Agent, or Firm* — Locke Lord LLP; Tim Tingkang Xia, Esq.

(57) ABSTRACT

The disclosure provides a bicycle rear derailleur including a linkage assembly, a chain guiding assembly, a first assembling component, a first elastic component and a locking mechanism. The linkage assembly is a four-link mechanism and includes a fixed component, a movable component, a first link and a second link. The chain guiding assembly is pivotably connected to the movable component. The first assembling component is pivotably connected to the movable component and disposed between the first assembling component and the chain guiding assembly. The opposite ends of the first elastic component are respectively fixed to the movable component and the first assembling component so as to provide a torque that allows the first assembling component to be pivotable with respect to the movable component.

22 Claims, 24 Drawing Sheets

(56) References Cited

U.S. PATENT DOCUMENTS

| | | | |
|---|---|---|---|
| 2012/0083371 A1* | 4/2012 | Yamaguchi | B62M 9/126 474/80 |
| 2012/0083372 A1* | 4/2012 | Yamaguchi | B62M 9/126 474/80 |
| 2013/0130853 A1* | 5/2013 | Bohm | B62M 9/1244 474/80 |
| 2013/0288834 A1* | 10/2013 | Yamaguchi | B62M 9/1244 474/80 |
| 2016/0046352 A1* | 2/2016 | Shipman | B62M 9/126 474/80 |
| 2016/0176478 A1* | 6/2016 | Chang | B62M 9/16 474/69 |
| 2019/0100279 A1* | 4/2019 | Brown | B62M 9/124 |
| 2020/0062343 A1* | 2/2020 | Braedt | B62M 9/124 |

* cited by examiner

BICYCLE REAR DERAILLEUR

CROSS-REFERENCE TO RELATED APPLICATIONS

This non-provisional application claims priority under 35 U.S.C. § 119(a) on Patent Application No(s). 107129254 filed in Taiwan, R.O.C. on Aug. 22, 2018, the entire contents of which are hereby incorporated by reference.

TECHNICAL FIELD

The disclosure relates to a bicycle rear derailleur, more particular a bicycle rear derailleur that includes a locking mechanism.

BACKGROUND

In recent years, riding bicycle becomes one of the popular sport, causing the bicycle market flourished. In order to meet requirements of users, the manufacturers have improved the function and the equipment of a bicycle. In general, the bicycle has a chain ring and a cassette, and the chain ring and the cassette are connected to each other via a chain. When the user steps on pedals of the bicycle, the chain ring is rotated to rotate the cassette via the chain. As such, the rear wheel of the bicycle is driven by the cassette to allow the bicycle to move forward. In addition, the bicycle also has a front derailleur and a rear derailleur. The user can adjust the gear ratio between the front derailleur and the rear derailleur according to the road condition.

However, the conventional of the rear derailleurs are inconvenient for being detached and the removal of the bicycle chain as well. In detail, there is a torsion spring disposed between a four-link mechanism and a chain guiding assembly of the rear derailleur for keep tension on the chain, thus the removal of the chain or the rear derailleur requires to loosen the chain. To do so, the user has to pivot the chain guiding assembly in a way that overcomes the elastic force of the torsion spring and to plug a pin to fix the chain guiding assembly in position at the same time. This operation should be performed by two hands, which is inconvenient to the user and is a problem desired to be solved.

SUMMARY OF THE INVENTION

One embodiment of the disclosure provides a bicycle rear derailleur, adapted to be fixed to a bicycle frame and to guide a bicycle chain, includes a linkage assembly, a chain guiding assembly, a first assembling component, a first elastic component and a locking mechanism. The linkage assembly includes a fixed component, a movable component, a first link and a second link. The fixed component is configured to be fixed on the bicycle frame. Two ends of the first link are respectively pivotably connected to the fixed component and the movable component. Two ends of the second link are respectively pivotably connected to the fixed component and the movable component. The chain guiding assembly is pivotably connected to the movable component. The first assembling component is pivotably connected to the movable component and disposed between the first assembling component and the chain guiding assembly. The opposite ends of the first elastic component are respectively fixed to the movable component and the first assembling component so as to provide a torque that allows the first assembling component to be pivotable with respect to the movable component. The locking mechanism has a fixed state and a released state. When the fixed component is in the fixed state, the locking mechanism allows the chain guiding assembly and the first assembling component to be moved together. When the fixed component is in the released state, the locking mechanism allows the first assembling component to be pivotable with respect to the chain guiding assembly.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
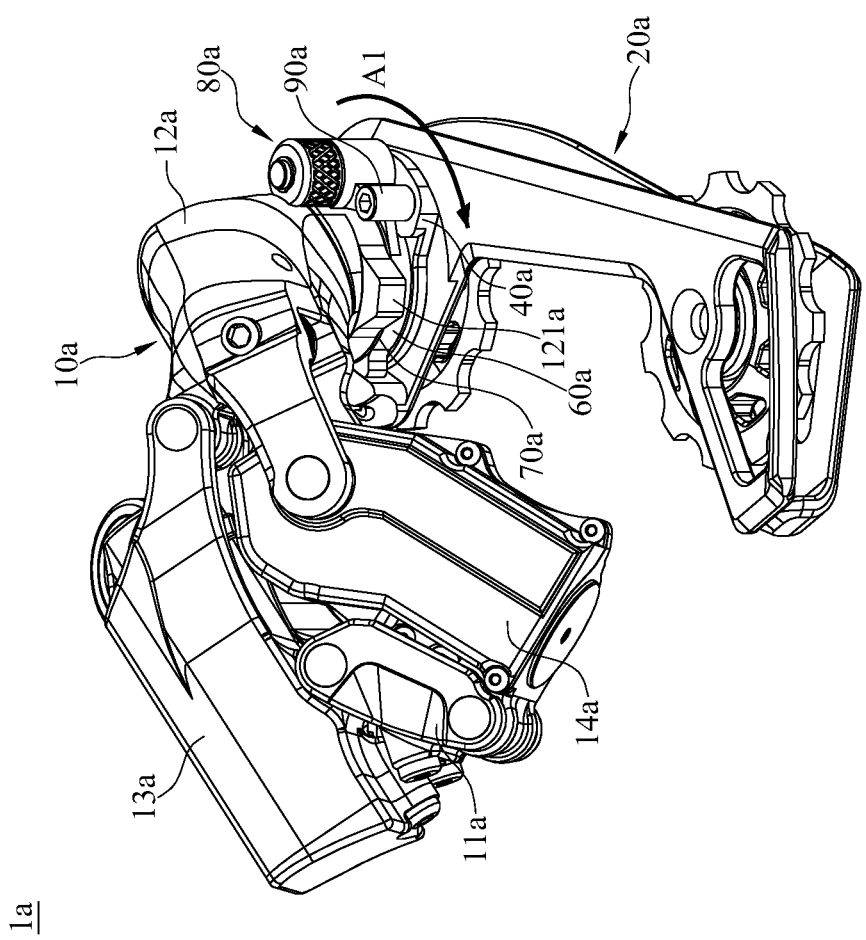
FIG. 1 is a perspective view of a bicycle rear derailleur according a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
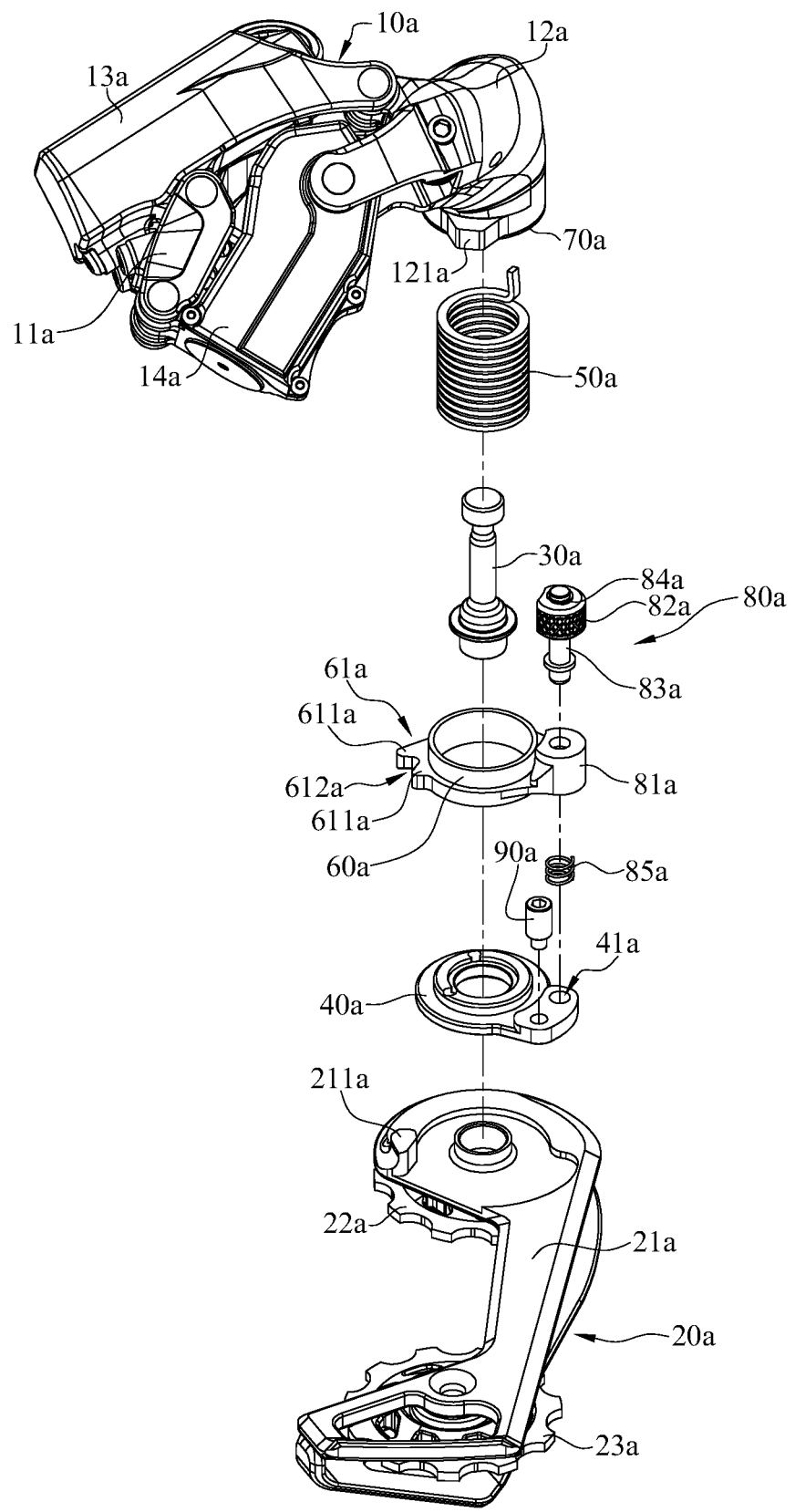
FIG. 2 is an exploded view of the bicycle rear derailleur in FIG. 1.

Please refer to FIG. 1 and FIG. 2. FIG. 1 is a perspective view of a bicycle rear derailleur according a first embodiment of the disclosure. FIG. 2 is an exploded view of the bicycle rear derailleur in FIG. 1.

This embodiment provides a bicycle rear derailleur 1a. The bicycle rear derailleur 1a includes a linkage assembly 10a, a chain guiding assembly 20a, a pivot post 30a, a first assembling component 40a, a first elastic component 50a, a second assembling component 60a, a washer 70a and a locking mechanism 80a.

The linkage assembly 10a includes a fixed component 11a, a movable component 12a, a first link 13a and a second link 14a. The fixed component 11a is configured to be fixed to a bicycle frame (not shown in figures). Two ends of the first link 13a are respectively pivotably connected to the fixed component 11a and the movable component 12a, and two ends of the second link 14a are respectively pivotably connected to the fixed component 11a and the movable component 12a. In this embodiment, the linkage assembly 10a that is consisted of the fixed component 11a, the movable component 12a, the first link 13a and the second link 14a is a four-link mechanism.

The chain guiding assembly 20a includes a frame 21a, a guide pulley 22a and a tension pulley 23a. The guide pulley 22a and the tension pulley 23a are pivotably disposed on the frame 21a, and the frame 21a is pivotably disposed on the movable component 12a via the pivot post 30a. The guide pulley 22a is configured to guide a bicycle chain (not shown in figures), and the tension pulley 23a is configured to keep tension on the bicycle chain.

The first assembling component 40a is disposed between the frame 21a of the chain guiding assembly 20a and the movable component 12a. Two opposite ends of the first elastic component 50a are respectively fixed to the movable component 12a and the first assembling component 40a and is able to provide a torque to pivot the first assembling component 40a with respect to the movable component 12a in a direction A1 (shown in FIG. 1).

The second assembling component 60a is disposed between the first assembling component 40a and the movable component 12a. In this embodiment, the frame 21a of the chain guiding assembly 20a has a first engagement structure 211a. The first engagement structure 211a is, for example, a block. The second assembling component 60a has a second engagement structure 61a, and the second engagement structure 61a includes two teeth 611a. The two teeth 611a form a slot 612a therebetween. The first engagement structure 211a is located in the slot 612a and clamped by the two teeth 611a, such that the second assembling component 60a is able to be moved with the chain guiding assembly 20a.

The washer 70a is disposed between the movable component 12a of the linkage assembly 10a and the second assembling component 60a and is able to reduce the friction between the movable component 12a and the second assembling component 60a.

The first assembling component 40a has an insertion hole 41a. The locking mechanism 80a includes a connecting part 81a, a head part 82a, a fixing post 83a, a fixing ring 84a and a second elastic component 85a. The connecting part 81a is fixed to the second assembling component 60a and has a through hole (not numbered). The head part 82a is disposed on a side of the connecting part 81a away from the first assembling component 40a. The fixing post 83a is slidably disposed through the head part 82a and partially inserted into the connecting part 81a. The fixing ring 84a is fixed at an end of the fixing post 83a away from the connecting part 81a so that the head part 82a is located between the fixing ring 84a and the connecting part 81a. The second elastic component 85a is disposed in the connecting part 81a, sleeved on the fixing post 83a, and located between an inner wall (not numbered) of the connecting part 81a and a flange (not numbered) of the fixing post 83a so as to force the fixing post 83a to move toward the first assembling component 40a. Accordingly, the locking mechanism 80a has a fixed state and a released state.

Figure 3:
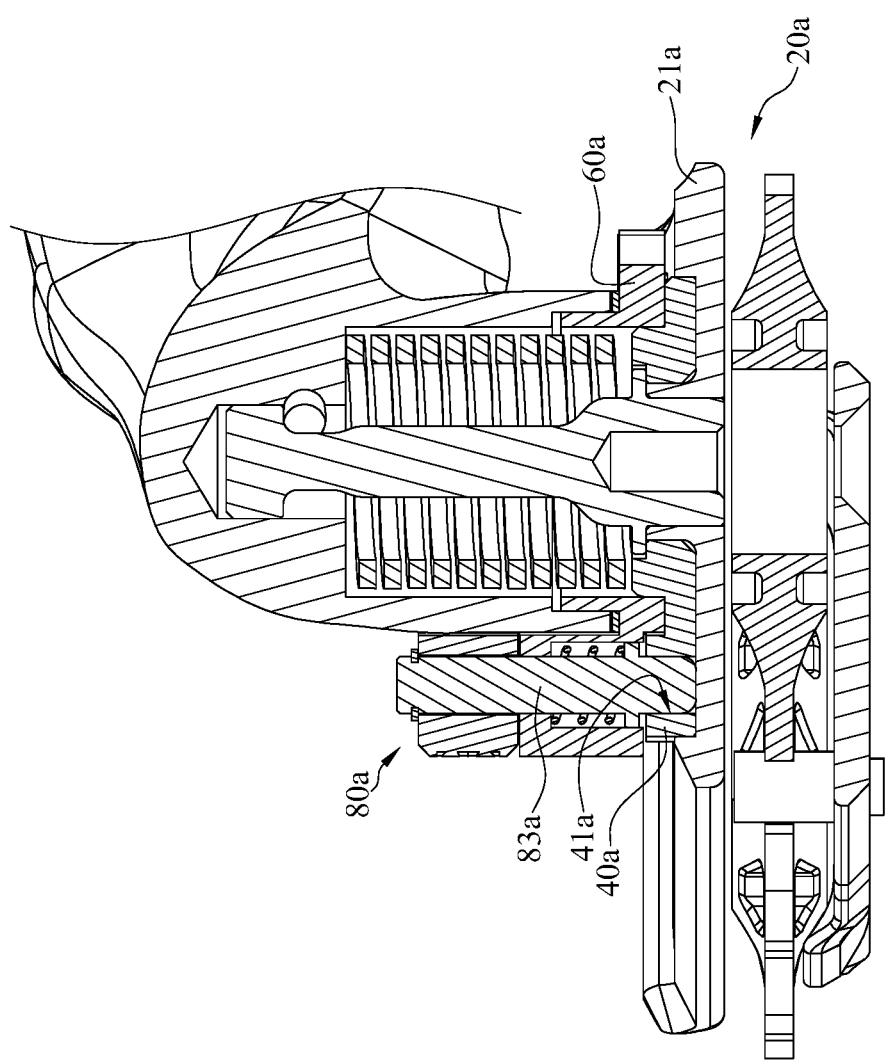
FIG. 3 is a cross-sectional view of the bicycle rear derailleur in FIG. 1.

Please refer to FIG. 3. FIG. 3 shows that the locking mechanism 80a is in the fixed state. In such a case, the fixing post 83a is partially inserted into the insertion hole 41a of the first assembling component 40a, such that the second assembling component 60a and the first assembling component 40a are engaged with each other and can be moved together. As such, the first assembling component 40a, the second assembling component 60a and the chain guiding assembly 20a can be pivoted together during the fixed state of the locking mechanism 80a.

Accordingly, when the bicycle rear derailleur 1a is installed on a bicycle frame (not shown), and the locking mechanism 80a is in the fixed state, the torque provided by the first elastic component 50a to the first assembling component 40a can be delivered to the chain guiding assembly 20a through the second assembling component 60a so as to pivot the chain guiding assembly 20a, thereby moving the tension pulley 23a to keep the tension on the bicycle chain. In addition, the second elastic component 85a can keep the fixing post 83a in the insertion hole 41a so as to secure the fixed state of the locking mechanism 80a.

Figure 4:
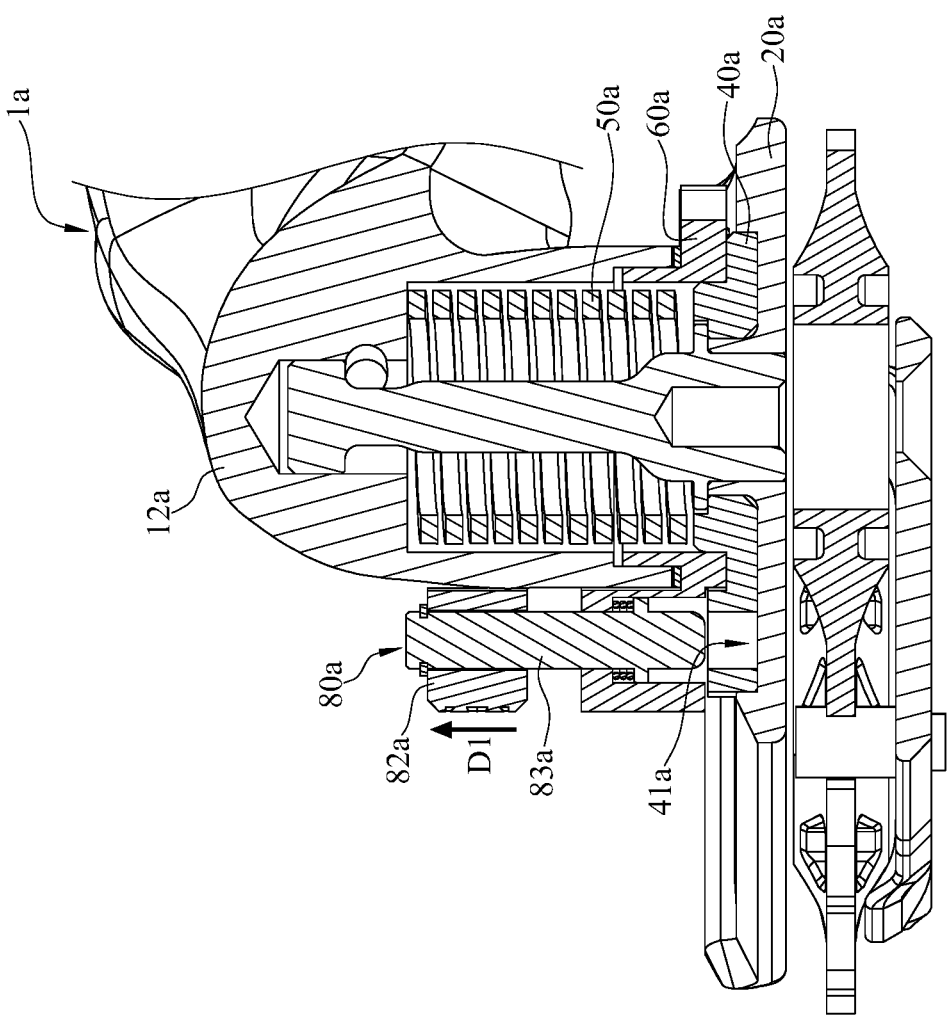
FIG. 4 is a cross-sectional view of the bicycle rear derailleur in FIG. 3 when a fixing post is detached from an insertion hole.

Then, please refer to FIG. 4, the head part 82a is moved in a direction D1 by single hand to pull the fixing post 83a out of the insertion hole 41a so that the locking mechanism 80a is switched to the released state. By doing so, the first assembling component 40a is disengaged from the second assembling component 60a so that the torque provided by the first elastic component 50a to the first assembling component 40a is not able to be delivered to the chain guiding assembly 20a. As a result, the chain guiding assembly 20a may pivot in a direction opposite to the direction A1 (e.g., in FIG. 1) due to the gravity and cause the bicycle chain to go slack. In such a case, it becomes easy to detach the bicycle chain from the bicycle rear derailleur 1a or to detach the bicycle rear derailleur 1a from the bicycle frame.

In short, the bicycle rear derailleur 1a makes the removal of the bicycle chain or the bicycle rear derailleur convenient and easy.

Figure 5:
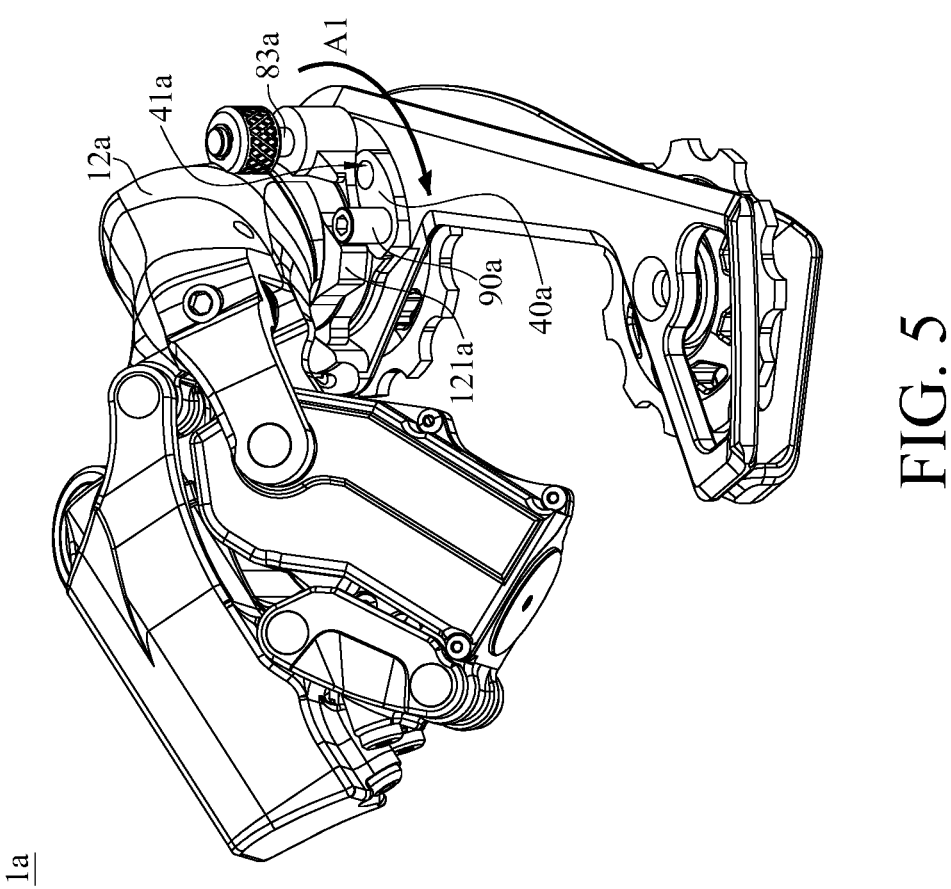
FIG. 5 is a perspective view of the bicycle rear derailleur in FIG. 1 when a positioning post is in contact with a stopper.

Then, please refer to FIG. 5. In this embodiment, the bicycle rear derailleur 1a further includes a positioning post 90a fixed on the first assembling component 40a, and the movable component 12a has a stopper 121a (e.g., a protrusion). During the released state of the locking mechanism 80a (i.e., when the fixing post 83a is detached from the insertion hole 41a), the first assembling component 40a is pivoted in the direction A1 by being forced by the first elastic component 50a (as shown in FIG. 4). And the first assembling component 40a can be stopped by the stopper 121a when the positioning post 90a hits the stopper 121a, such that the first assembling component 40a is held in a position that can still experience the torque provided by the first elastic component 50a.

Figure 6:
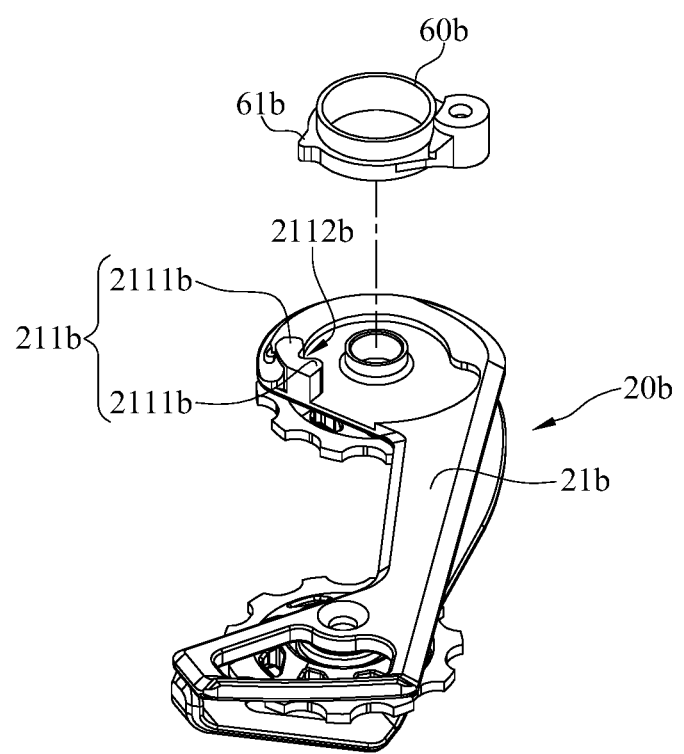
FIG. 6 is a partially exploded view of a bicycle rear derailleur according to a second embodiment of the disclosure.

In addition, the configuration of the first engagement structure 211a of the frame 21a is not restricted. Please refer to FIG. 6. FIG. 6 is a partially exploded view of a bicycle rear derailleur according to a second embodiment of the disclosure. It is noted that some of the components of the bicycle rear derailleur of the second embodiments are similar to those described in the previous embodiment, thus, for the purpose of illustration, only the difference between the second embodiment from the previous embodiment will be illustrated in the following paragraph, and the descriptions of similar components are not included.

In this embodiment, a first engagement structure 211b of a frame 21b of a chain guiding assembly 20b includes two teeth 2111b, and the two teeth 2111b form a slot 2112b therebetween. A second engagement structure 61b of the second assembling component 60b is a block. The second engagement structure 61b is located in the slot 2112b and clamped by the two teeth 2111b, such that the second assembling component 60b and the frame 21b are engaged with each other.

Figure 7:
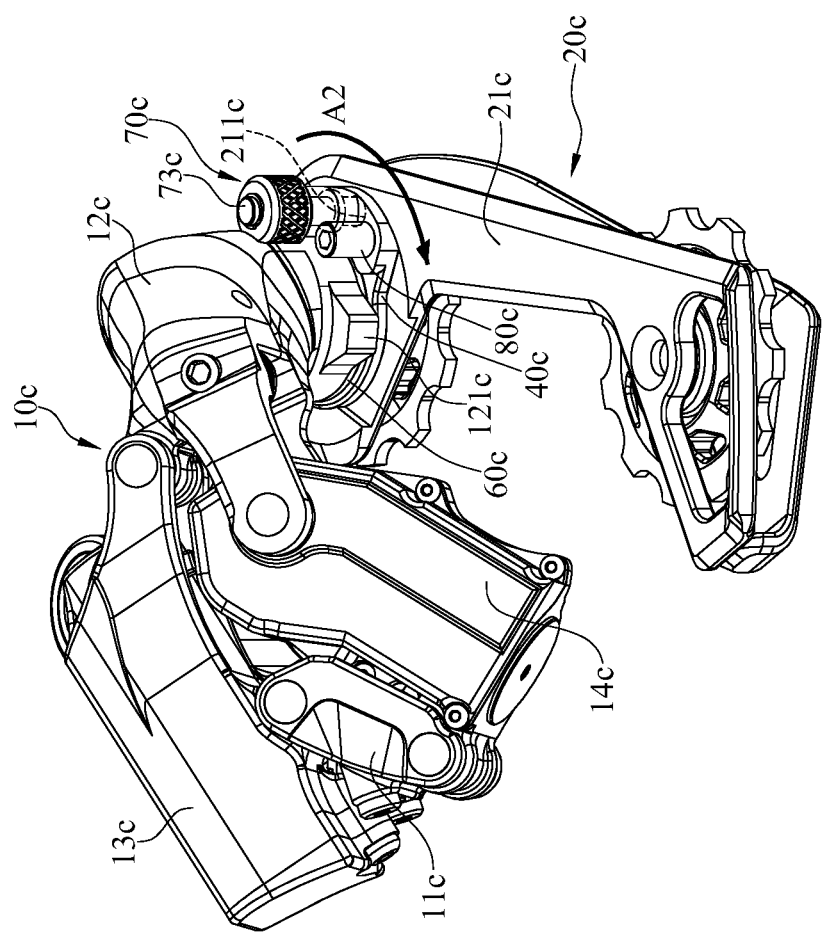
FIG. 7 is a perspective view of a bicycle rear derailleur according a third embodiment of this disclosure.
Figure 8:
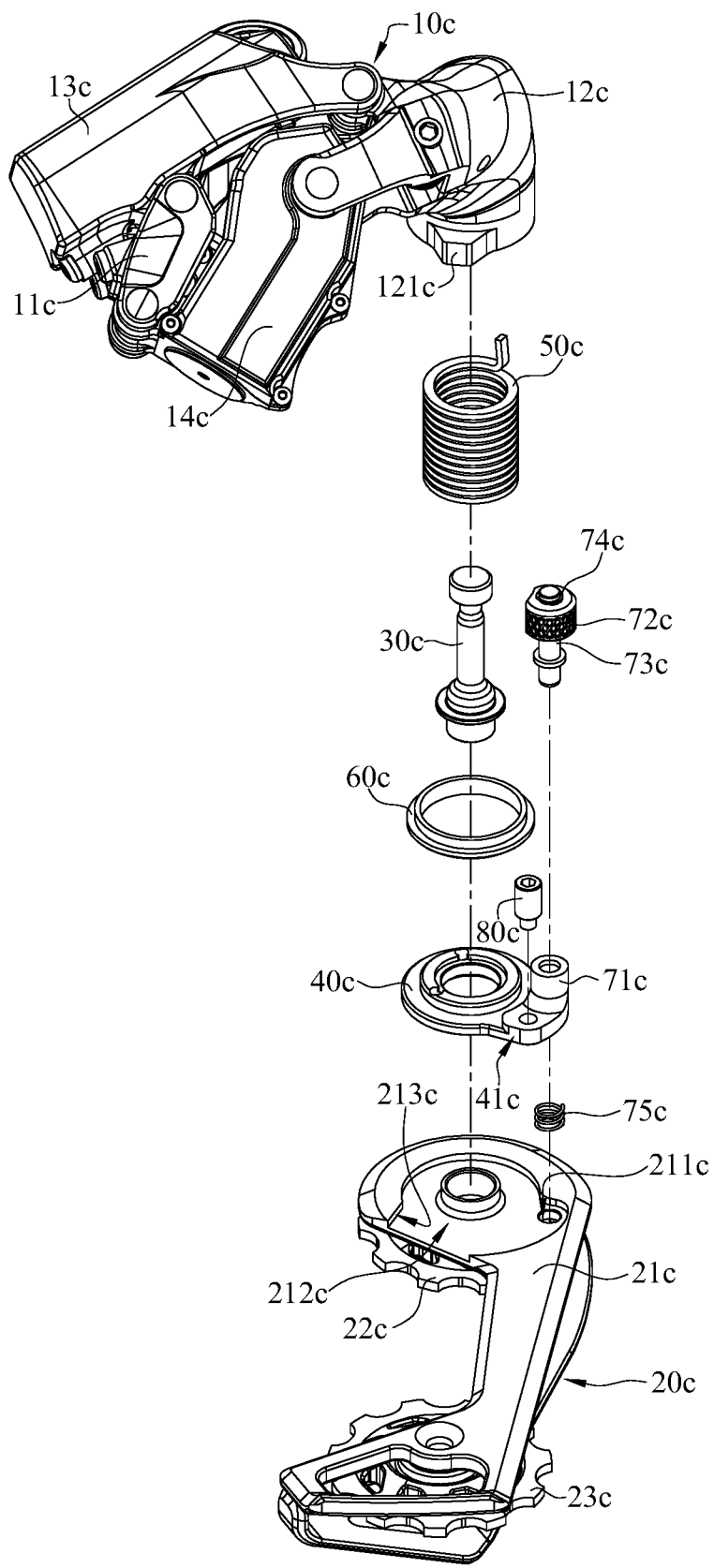
FIG. 8 is an exploded view of the bicycle rear derailleur in FIG. 7.

Further, in the disclosure, the bicycle rear derailleur may only include one of the first assembling component and the second assembling component. Please refer to FIG. 7 and FIG. 8. FIG. 7 is a perspective view of a bicycle rear derailleur according a third embodiment of this disclosure. FIG. 8 is an exploded view of the bicycle rear derailleur in FIG. 7.

This embodiment provides a bicycle rear derailleur 1c. The bicycle rear derailleur 1c includes a linkage assembly 10c, a chain guiding assembly 20c, a pivot post 30c, a first assembling component 40c, a first elastic component 50c, a washer 60c and a locking mechanism 70c.

The linkage assembly 10c includes a fixed component 11c, a movable component 12c, a first link 13c and a second link 14c. The fixed component 11c is configured to be fixed to a bicycle frame (not shown in figures). Two ends of the first link 13c are respectively pivotably connected to the fixed component 11c and the movable component 12c, and two ends of the second link 14c are respectively pivotably connected to the fixed component 11c and the movable component 12c. In this embodiment, the linkage assembly 10c that is consisted of the fixed component 11c, the movable component 12c, the first link 13c and the second link 14c is a four-link mechanism.

The chain guiding assembly 20c includes a frame 21c, a guide pulley 22c and a tension pulley 23c. The guide pulley 22c and the tension pulley 23c are pivotably connected to the frame 21c, and the frame 21c is pivotably connected to the movable component 12c via the pivot post 30c. The guide pulley 22c is configured to guide a bicycle chain (not shown in figures), and the tension pulley 23c is configured to keep tension on the bicycle chain.

The first assembling component 40c is disposed between the frame 21c of the chain guiding assembly 20c and the movable component 12c. Two opposite ends of the first elastic component 50c are respectively fixed to the movable component 12c and the first assembling component 40c and is able to provide a torque to pivot the first assembling component 40c with respect to the movable component 12c in a direction A2 (shown in FIG. 7).

The washer 60c is, for example, a washer. The washer 60c is disposed between the movable component 12c of the linkage assembly 10c and the first assembling component 40c.

The frame 21c of the chain guiding assembly 20c has an insertion hole 211c. The locking mechanism 70c includes a connecting part 71c, a head part 72c, a fixing post 73c, a fixing ring 74c and a second elastic component 75c. The connecting part 71c is inseparably fixed to the first assembling component 40c and has a through hole (not numbered). The head part 72c is disposed on a side of the connecting part 71c away from the frame 21c. The fixing post 73c is slidably disposed through the head part 72c and partially inserted into the connecting part 71c. The fixing ring 74c is fixed at an end of the fixing post 73c away from the connecting part 71c so that the head part 82c is located between the fixing ring 74c and the connecting part 71c. The second elastic component 75c is disposed in the connecting part 71c, sleeved on the fixing post 73c, and located between an inner wall (not numbered) of the connecting part 71c and a flange (not numbered) of the fixing post 73c so as to force the fixing post 73c to move toward the chain guiding assembly 20c. Accordingly, the locking mechanism 70c has a fixed state and a released state.

As shown in FIG. 7, FIG. 7 shows the locking mechanism 70c is in the fixed state. In such case, the fixing post 73c is partially inserted into the insertion hole 211c of the frame 21c of the chain guiding assembly 20c, such that the first assembling component 40c and the chain guiding assembly 20c are engaged with each other and can be moved together. As such, the first assembling component 40c and the chain guiding assembly 20c can be pivoted together during the fixed state of the locking mechanism 70c.

Figure 9:
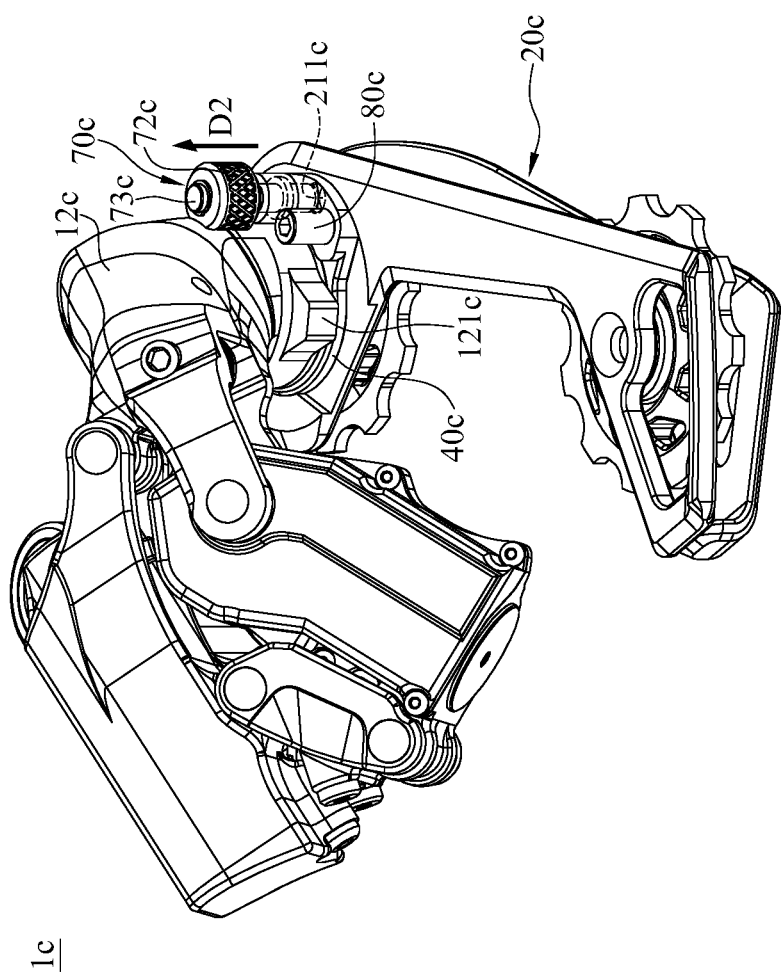
FIG. 9 is a perspective view of the bicycle rear derailleur in FIG. 7 when a fixing post is detached from an insertion hole.

Then, please refer to FIG. 9. FIG. 9 is a perspective view of the bicycle rear derailleur in FIG. 7 when a fixing post is detached from an insertion hole.

The head part 72c is moved in a direction D2 by single hand to pull the fixing post 73c out of the insertion hole 211c so that the locking mechanism 70c is switched to the released state. By doing so, the first assembling component 40c is disengaged from the chain guiding assembly 20c so that the torque provided by the first elastic component 50c (shown in FIG. 8) to the first assembling component 40c is not able to be delivered to the chain guiding assembly 20c. As result, the chain guiding assembly 20c may pivot in a direction opposite to the direction A2 (e.g., in FIG. 7) due to the gravity and cause the bicycle chain to go slack. In such a case, it becomes easy to detach the bicycle chain from the bicycle rear derailleur 1c or to detach the bicycle rear derailleur 1c from the bicycle frame. In short, the bicycle rear derailleur 1c makes the removal of the bicycle chain or the bicycle rear derailleur convenient and easy.

Figure 10:
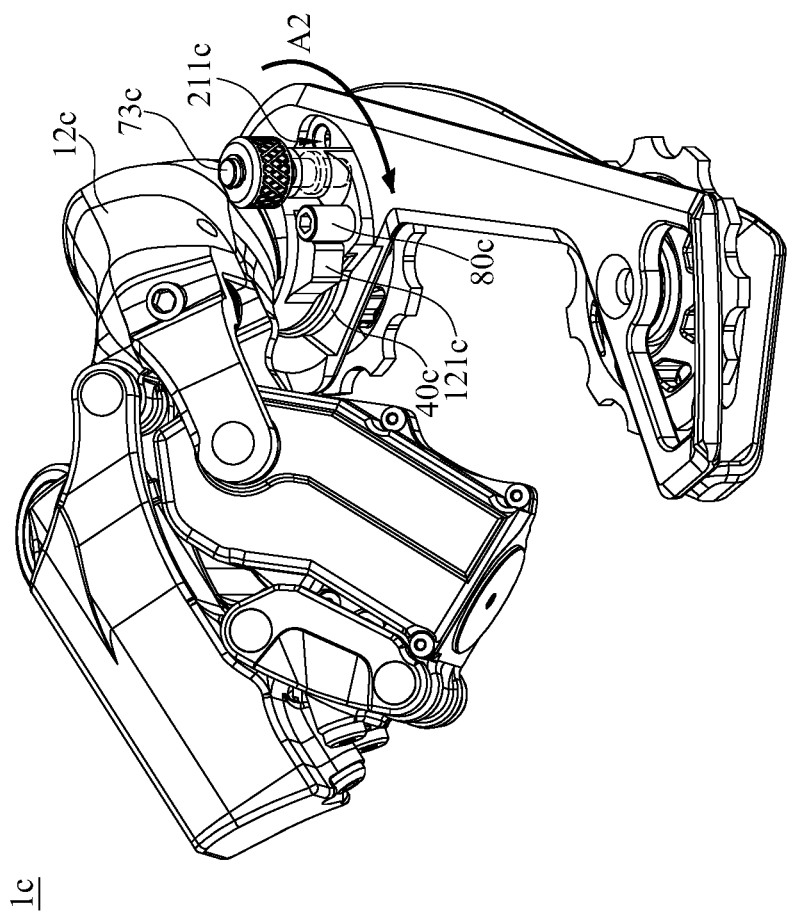
FIG. 10 is a perspective view of the bicycle rear derailleur in FIG. 7 when a positioning post is in contact with a stopper.

Then, please refer to FIG. 10. FIG. 10 is a perspective view of the bicycle rear derailleur in FIG. 7 when a positioning post is in contact with a stopper.

In this embodiment, the bicycle rear derailleur 1c further includes a positioning post 80c fixed on the first assembling component 40c, and the movable component 12c has a stopper 121c (e.g., a protrusion). During the released state of the locking mechanism 70c (i.e., when the fixing post 73c is detached from the insertion hole 211c), the first assembling component 40c is pivoted in the direction A2 by being forced by the first elastic component 50c (shown in FIG. 8). And the positioning post 80c can be stopped by the stopper 121c when the positioning post 80c hits the stopper 121c, such that the first assembling component 40c is held in a position that can still experience the torque provided by the first elastic component 50c.

Figure 11:
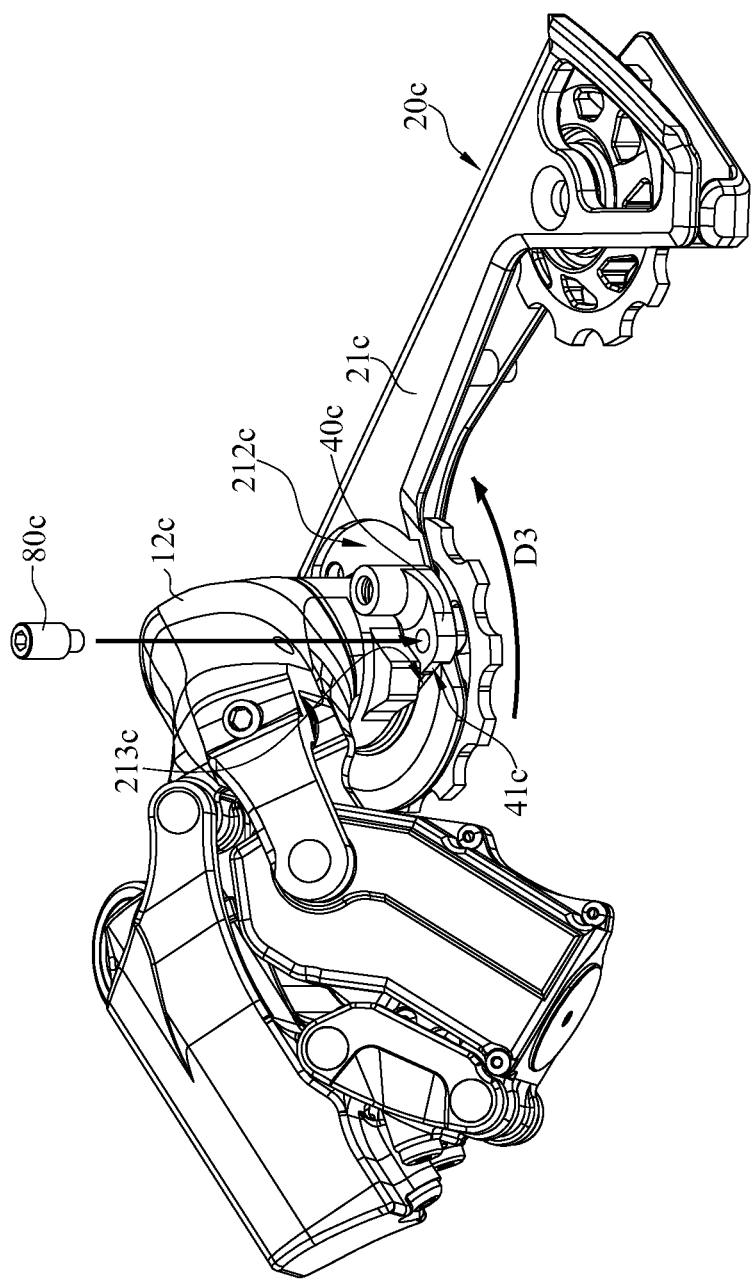
FIG. 11 is a perspective view of the bicycle rear derailleur in FIG. 7 when a first assembling component is to be mounted in position.

Then, please refer to FIG. 8 and FIG. 11. FIG. 11 is a partial perspective view of the bicycle rear derailleur in FIG. 7 when a first assembling component is to be mounted in position. The frame 21c of the chain guiding assembly 20c further has a slot 212c and a side wall 213c which faces the slot 212c, and the first assembling component 40c has a contact surface 41c. In this embodiment, the side wall 213c of the frame 21c and the contact surface 41c of the first assembling component 40c can help the first assembling component 40c to be mounted on the movable component 12c. In detail, the process of mounting the first assembling component 40c on the movable component 12c may include the following steps: first is to respectively fix two opposite ends of the first elastic component 50c to the first assembling component 40c and the movable component 12c, and then is to pivot the chain guiding assembly 20c in a direction D3 so as to make the side wall 213c of the frame 21c and the contact surface 41c of the first assembling component 40c in contact with each other and further to force the first assembling component 40c to pivot to a position that can still experience the torque provided by the first elastic component 50c, and the last is to mount the positioning post 80c on the first assembling component 40c so as to finish the installation of the first assembling component 40c.

Figure 12:
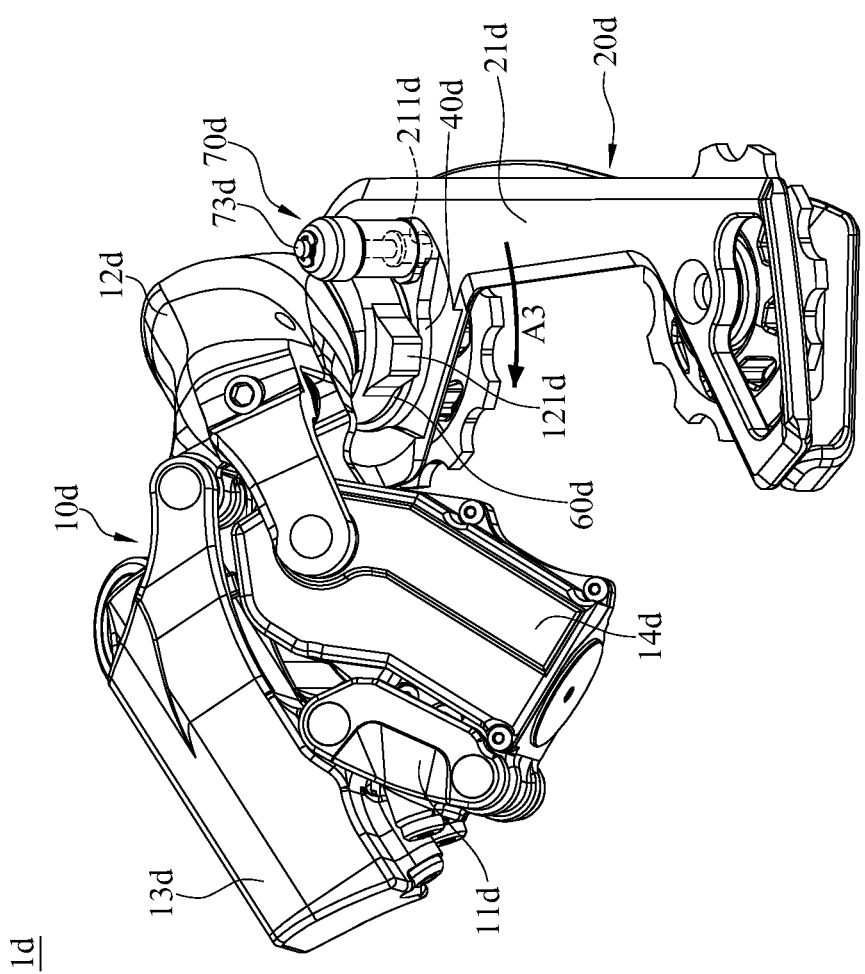
FIG. 12 is a perspective view of a bicycle rear derailleur according a fourth embodiment of this disclosure.
Figure 13:
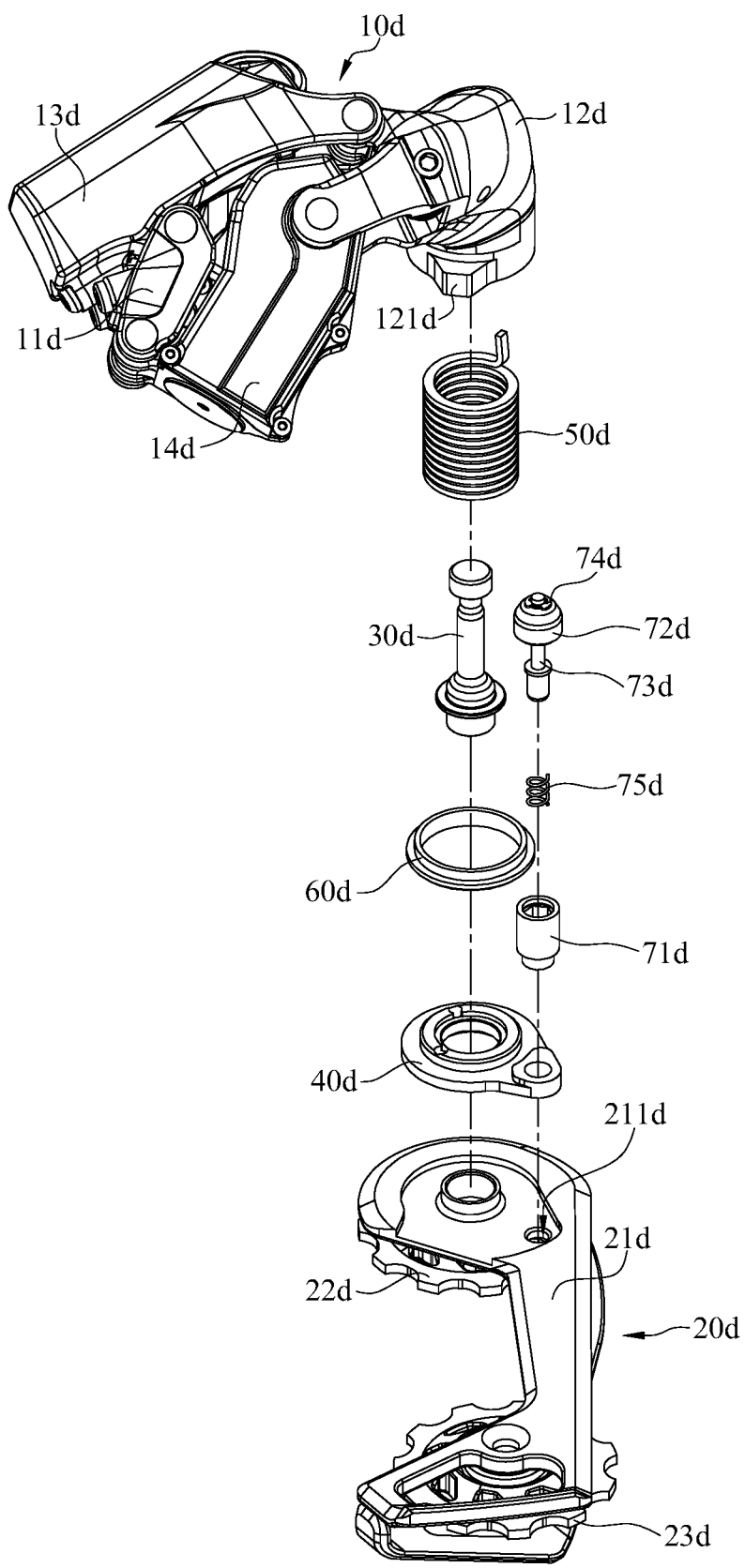
FIG. 13 is an exploded view of the bicycle rear derailleur in FIG. 12.

Then, please refer to FIG. 12 and FIG. 13. FIG. 12 is a perspective view of a bicycle rear derailleur according a fourth embodiment of this disclosure. FIG. 13 is an exploded view of the bicycle rear derailleur in FIG. 12. This embodiment provides a bicycle rear derailleur 1d. The bicycle rear derailleur 1d includes a linkage assembly 10d, a chain guiding assembly 20d, a pivot post 30d, a first assembling component 40d, a first elastic component 50d, a washer 60d and a locking mechanism 70d.

The linkage assembly 10d includes a fixed component 11d, a movable component 12d, a first link 13d and a second link 14d. The fixed component 11d is configured to be fixed to a bicycle frame (not shown in figures). Two ends of the first link 13d are respectively pivotably connected to the fixed component 11d and the movable component 12d, and two ends of the second link 14d are respectively pivotably connected to the fixed component 11d and the movable component 12d. In this embodiment, the linkage assembly 10d that is consisted of the fixed component 11d, the movable component 12d, the first link 13d and the second link 14d is a four-link mechanism.

The chain guiding assembly 20d includes a frame 21d, a guide pulley 22d and a tension pulley 23d. The guide pulley 22d and the tension pulley 23d are pivotably connected to the frame 21d, and the frame 21d is pivotably connected to the movable component 12a via the pivot post 30d. The guide pulley 22d is configured to guide a bicycle chain (not shown in figures), and the tension pulley 23d is configured to keep tension on the bicycle chain.

The first assembling component 40d is disposed between the frame 21d of the chain guiding assembly 20d and the movable component 12d. Two opposite ends of the first elastic component 50d are respectively fixed to the movable component 12d and the first assembling component 40d and is able to provides a torque to pivot the first assembling component 40d with respect to the movable component 12d in a direction A3 (shown in FIG. 12).

The washer 60d is, for example, a washer. The washer 60d is disposed between the movable component 12d of the linkage assembly 10d and the first assembling component 40d.

The frame 21d of the chain guiding assembly 20d has an insertion hole 211d. The locking mechanism 70d includes a connecting part 71d, a head part 72d, a fixing post 73d, a fixing ring 74d and a second elastic component 75d. The connecting part 71d is detachably fixed on the first assembling component 40d and has through hole (not numbered). The head part 72d is disposed on a side of the connecting part 71d away from the frame 21d. The fixing post 73d is disposed through the head part 72d and partially inserted into the connecting part 71d. The fixing ring 74d is fixed at an end of the fixing post 73d away from the connecting part 71d so that the head part 72d is located between the fixing ring 74d and the connecting part 71d. The second elastic component 75d is disposed in the connecting part 71d, sleeved on the fixing post 73d, and located between an inner wall (not numbered) of the connecting part 71d and a flange (not numbered) of the fixing post 73d so as to force the fixing post 73d to move toward the chain guiding assembly 20d. Accordingly, the locking mechanism 70d has a fixed state and a released state.

As shown in FIG. 12, FIG. 12 shows the locking mechanism 70d is in the fixed state. In such case, the fixing post 73d is partially inserted into the insertion hole 211d of the frame 21d of the chain guiding assembly 20d, such that the first assembling component 40d and the chain guiding assembly 20d are engaged with each other and can be moved together. As such, the first assembling component 40d and the chain guiding assembly 20d can be pivoted together during the fixed state of the locking mechanism 70d.

Figure 14:
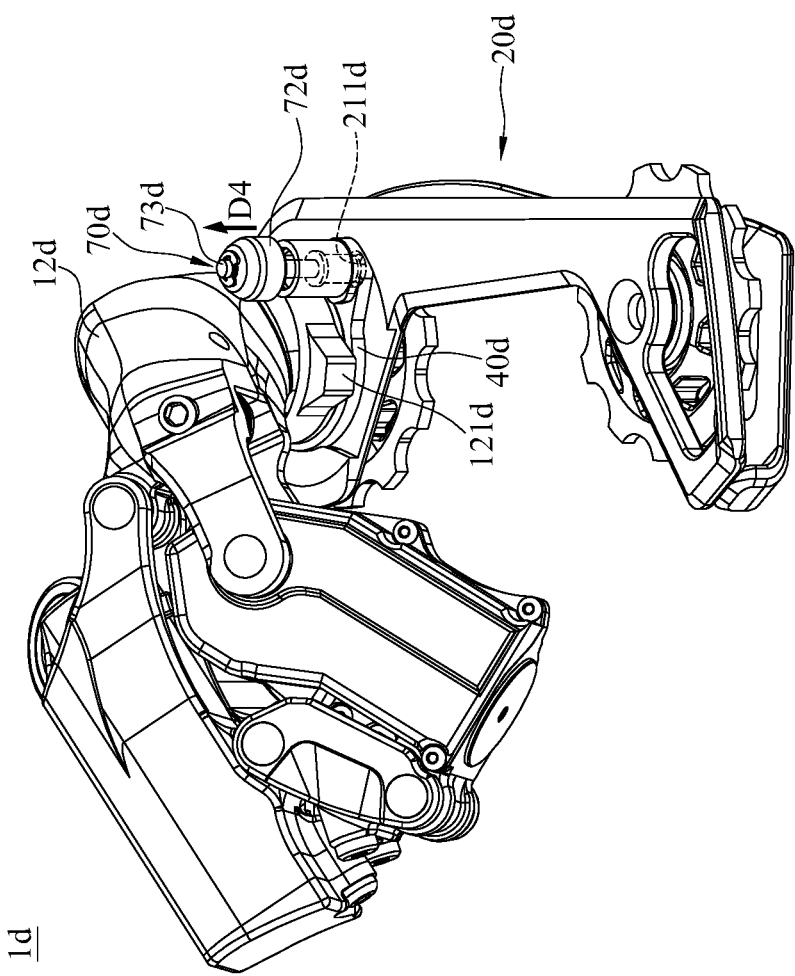
FIG. 14 is a perspective view of the bicycle rear derailleur in FIG. 12 when a fixing post is detached from an insertion hole.

Then, please refer to FIG. 14. FIG. 14 is a perspective view of the bicycle rear derailleur in FIG. 12 when a fixing post is detached from an insertion hole.

The head part 72d is moved in a direction D4 by single hand to pull the fixing post 73d out of the insertion hole 211d so that the locking mechanism 70d is switched to the released state. By doing so, the first assembling component 40d is disengaged from the chain guiding assembly 20d so that the torque provided by the first elastic component 50d (shown in FIG. 13) to the first assembling component 40d is not able to be delivered to the chain guiding assembly 20d. As result, the chain guiding assembly may pivot in a direction opposite to the direction A3 (e.g., in FIG. 12) due to the gravity and cause the bicycle chain to go slack. In such a case, it becomes easy to detach the bicycle chain from the bicycle rear derailleur 1d or to detach the bicycle rear derailleur 1d from the bicycle frame. In short, the bicycle rear derailleur 1d makes the removal of the bicycle chain or the bicycle rear derailleur convenient and easy.

Figure 15:
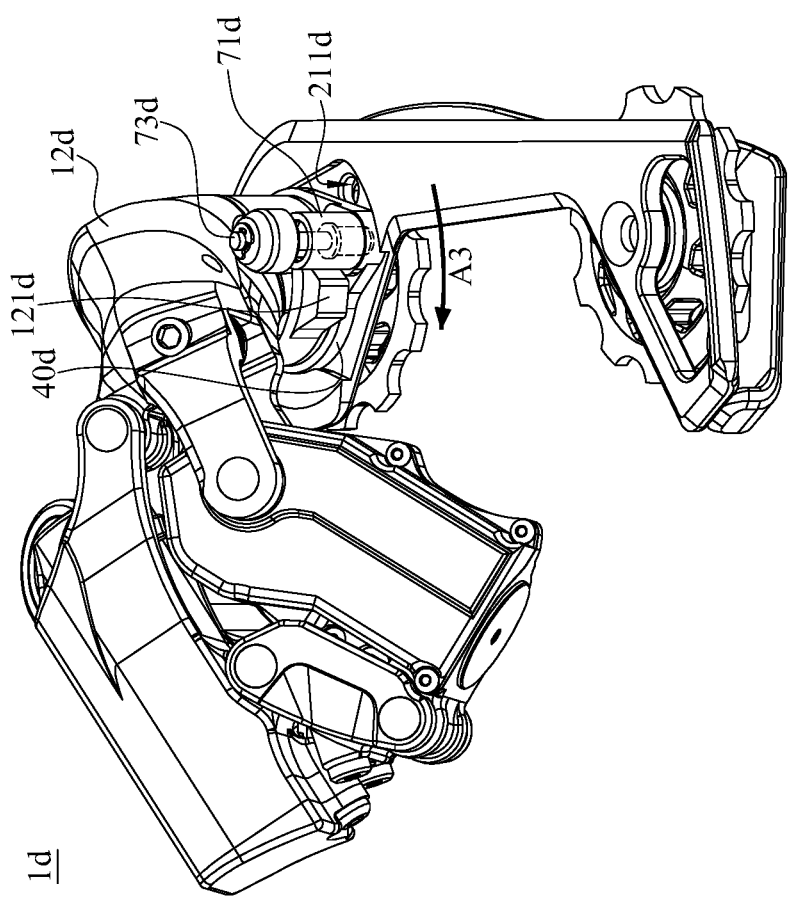
FIG. 15 is a perspective view of the bicycle rear derailleur in FIG. 12 when a positioning post is in contact with a stopper.

Then, please refer to FIG. 15. FIG. 15 is a perspective view of the bicycle rear derailleur in FIG. 12 when a positioning post is in contact with a stopper.

In this embodiment, the movable component 12d has a stopper 121d (e.g., a protrusion). In addition, the connecting part 71d not only allows the fixing post 73d and the second elastic component 75d (shown in FIG. 13) to be mounted on it, but also positions the first assembling component 40d in a position that can still experience the torque provided by the first elastic component 50d (shown in FIG. 13). In detail, During the released state of the locking mechanism 70d (i.e., when the fixing post 73d is detached from the insertion hole 211d), the first assembling component 40d is pivoted in the direction A3 by being forced by the first elastic component 50d. And the connecting part 71d can be stopped by the stopper 121d when the connecting part 71d hits the stopper 121, such that the first assembling component 40d is held in the position that can still experience the torque provided by the first elastic component 50d.

Figure 16:
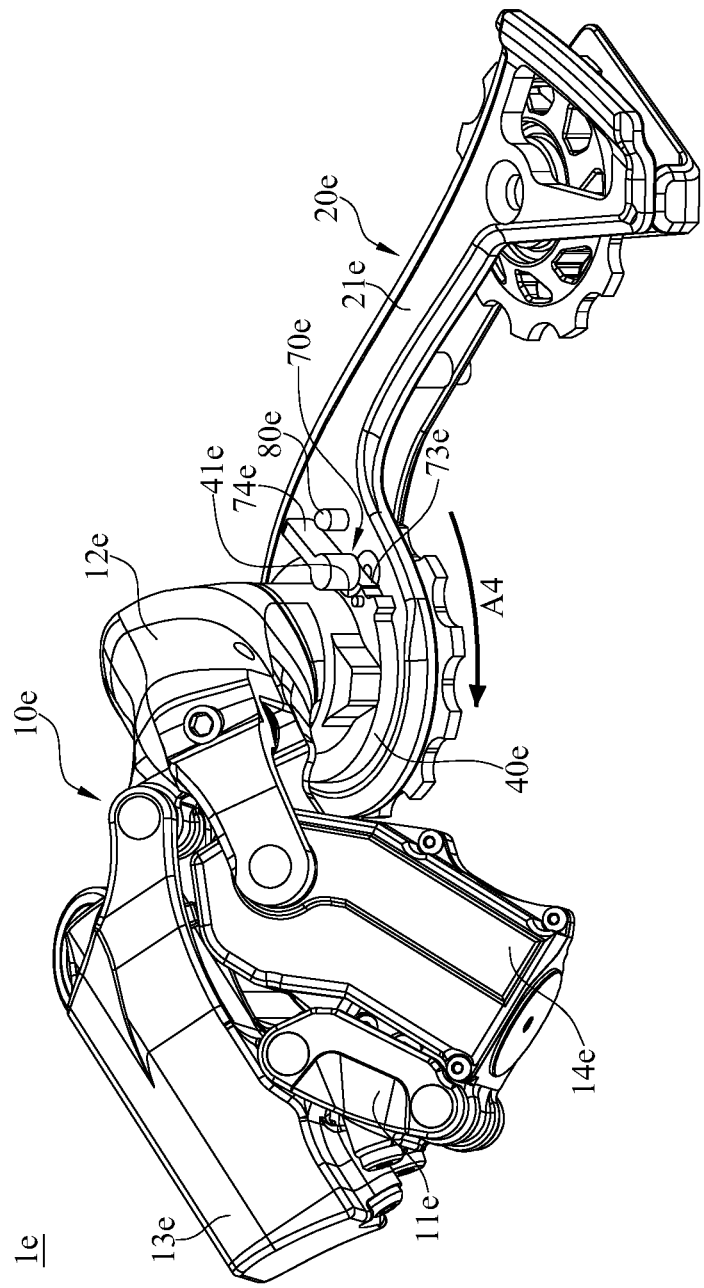
FIG. 16 is a perspective view of a bicycle rear derailleur according a fifth embodiment of this disclosure.
Figure 17:
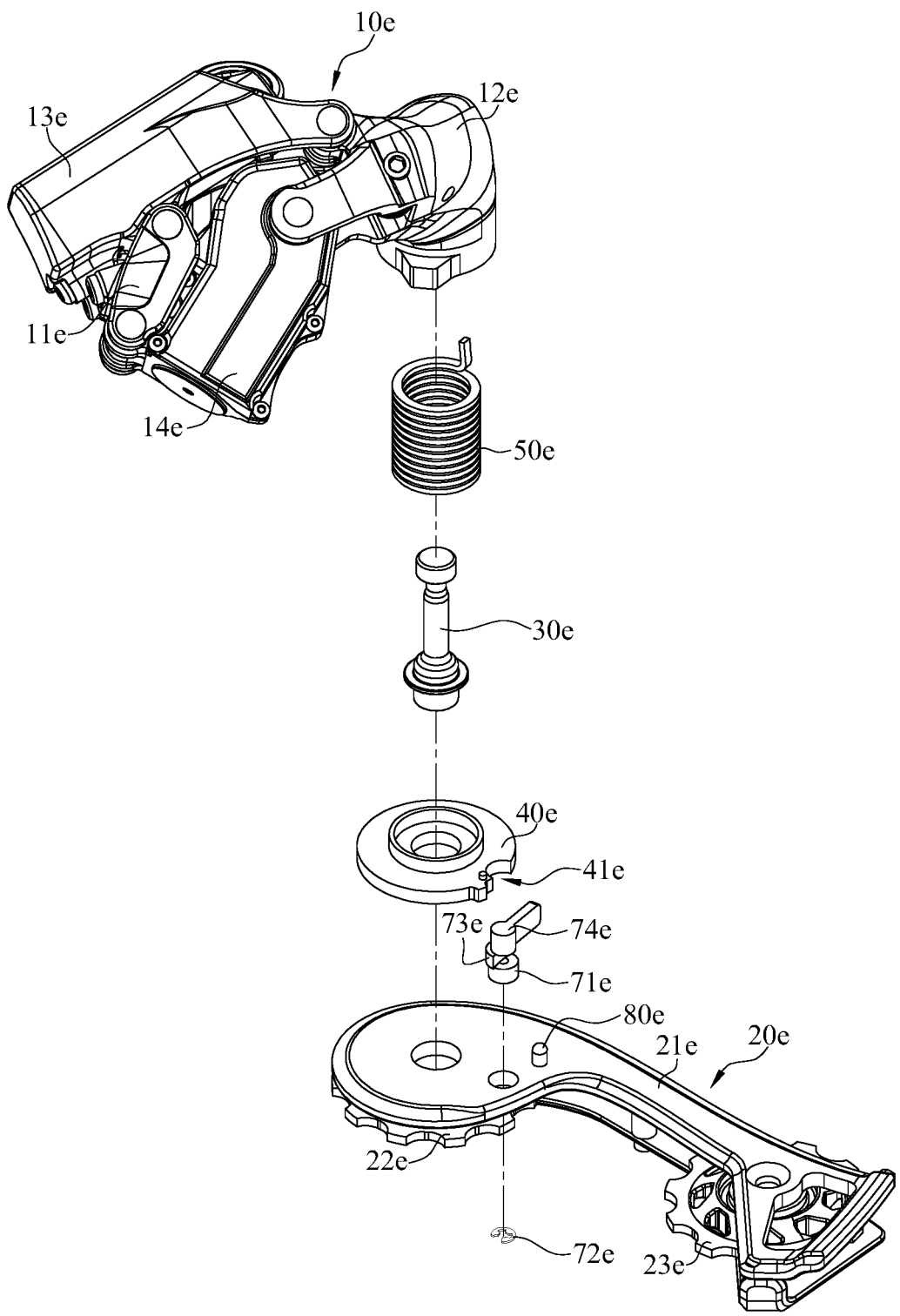
FIG. 17 is an exploded view of the bicycle rear derailleur in FIG. 16.

Then, please refer to FIG. 16 and FIG. 17. FIG. 16 is a perspective view of a bicycle rear derailleur according a fifth embodiment of this disclosure. FIG. 17 is an exploded view of the bicycle rear derailleur in FIG. 16. This embodiment provides a bicycle rear derailleur 1e. The bicycle rear derailleur 1e includes a linkage assembly 10e, a chain guiding assembly 20e, a pivot post 30e, a first assembling component 40e, a first elastic component 50e and a locking mechanism 70e.

The linkage assembly 10e includes a fixed component 11e, a movable component 12e, a first link 13e and a second link 14e. The fixed component 11e is configured to be fixed to a bicycle frame (not shown in figures). Two ends of the first link 13e are respectively pivotably connected to the fixed component 11e and the movable component 12e, and two ends of the second link 14e are respectively pivotably connected to the fixed component 11e and the movable component 12e. In this embodiment, the linkage assembly 10e that is consisted of the fixed component 11e, the movable component 12e, the first link 13e and the second link 14e is a four-link mechanism.

The chain guiding assembly 20e includes a frame 21e, a guide pulley 22e and a tension pulley 23e. The guide pulley 22e and the tension pulley 23e are pivotably connected to the frame 21e, and the frame 21e is pivotably connected to the movable component 12e via the pivot post 30e. The guide pulley 22e is configured to guide a bicycle chain (not shown in figures), and the tension pulley 23e is configured to keep tension on the bicycle chain.

The first assembling component 40e is disposed between the frame 21e of the chain guiding assembly 20e and the movable component 12e. Two opposite ends of the first elastic component 50e are respectively fixed to the movable component 12e and the first assembling component 40e and is able to provide a torque to pivot the first assembling component 40e with respect to the movable component 12e in a direction A4 (shown in FIG. 16).

The first assembling component 40e has a holding slot 41e. The locking mechanism 70e includes a pivot 71e, a fixing ring 72e, a positioning block 73e, a handle 74e. Two opposite ends of the position block 73e are respectively connected to the pivot 71e and the handle 74e. The pivot 71e is disposed through the frame 21e of the chain guiding assembly 20e. The fixing ring 72e is fixed at an end of the pivot 71e away from the handle 74e so that the pivot 71e is rotatably fixed to the frame 21e. Accordingly, the locking mechanism 70e has a fixed state and a released state.

As shown in FIG. 16, FIG. 16 shows the locking mechanism 70e is in the fixed state. In such case, the positioning block 73e of the locking mechanism 70e is located in the holding slot 41e such that the first assembling component 40e and the chain guiding assembly 20e are engaged with each other and can be moved together. As such, the first assembling component 40e and the chain guiding assembly 20e can be pivoted together during the fixed state of the locking mechanism 70e.

In this embodiment, the bicycle rear derailleur 1e further includes a positioning post 80e. The positioning post 80e is, for example, a spring plunger. The positioning post 80e is pressably disposed on the frame 21e of the chain guiding assembly 20e. The positioning post 80e is configured to be in contact with the handle 74e to stop the locking mechanism 70e in the fixed state. The positioning post 80e can prevent the positioning block 73e of the locking mechanism 70e from being detached from the holding slot 41e due to an unwanted movement of the locking mechanism 70e.

Figure 18:
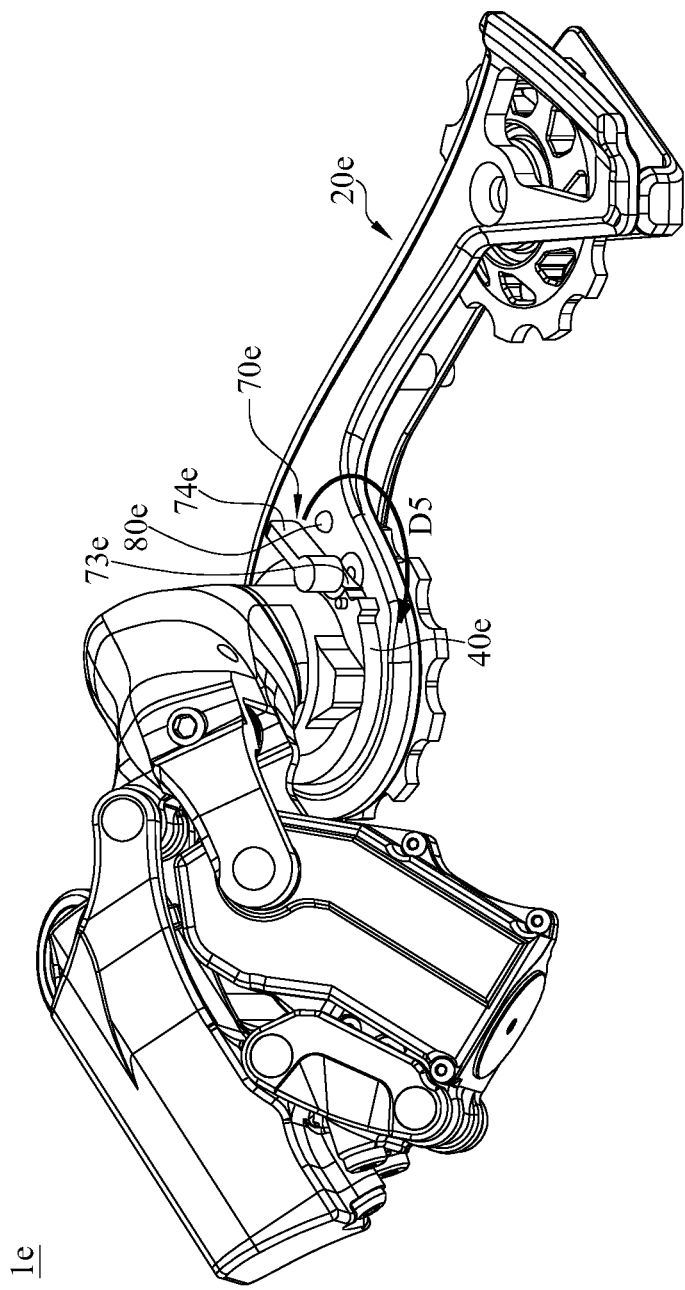
FIG. 18 is a perspective view of a bicycle rear derailleur in FIG. 16 when a positioning post is pressed.
Figure 19:
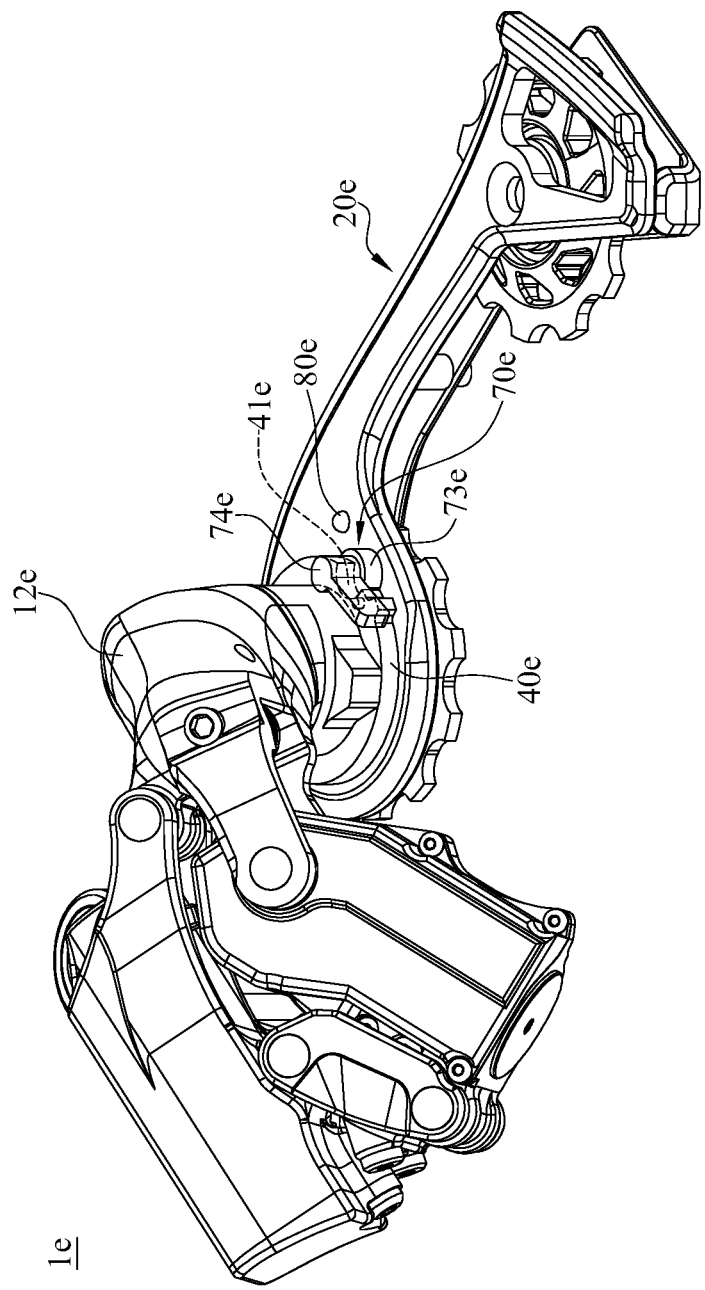
FIG. 19 is a perspective view of the bicycle rear derailleur in FIG. 16 when a positioning block is detached from a holding slot.

Then, please refer to FIG. 18 and FIG. 19. FIG. 18 is a perspective view of a bicycle rear derailleur in FIG. 16 when a positioning post is pressed. FIG. 19 is a perspective view of the bicycle rear derailleur in FIG. 16 when a positioning block is detached from a holding slot.

The positioning post 80e is pressed by single hand, and then the handle is moved in a direction D5 to pivot the positioning block 73e out of the holding slot 41e such that the locking mechanism 70e is switched to the released state. By doing so, the first assembling component 40e is disengaged from the chain guiding assembly 20e so that the torque provided by the first elastic component 50e (shown in FIG. 17) to first assembling component 40e is not able to be delivered to the chain guiding assembly 20e. As a result, the chain guiding assembly may pivot in a direction opposite to the direction A4 (e.g., FIG. 16) due to the gravity and cause the bicycle chain to go slack. In such a case, it becomes easy to detach the bicycle chain from the bicycle rear derailleur 1e or to detach the bicycle rear derailleur 1e from the bicycle frame. In short, the bicycle rear derailleur 1e makes the removal of the bicycle chain or the bicycle rear derailleur convenient and easy.

Figure 20:
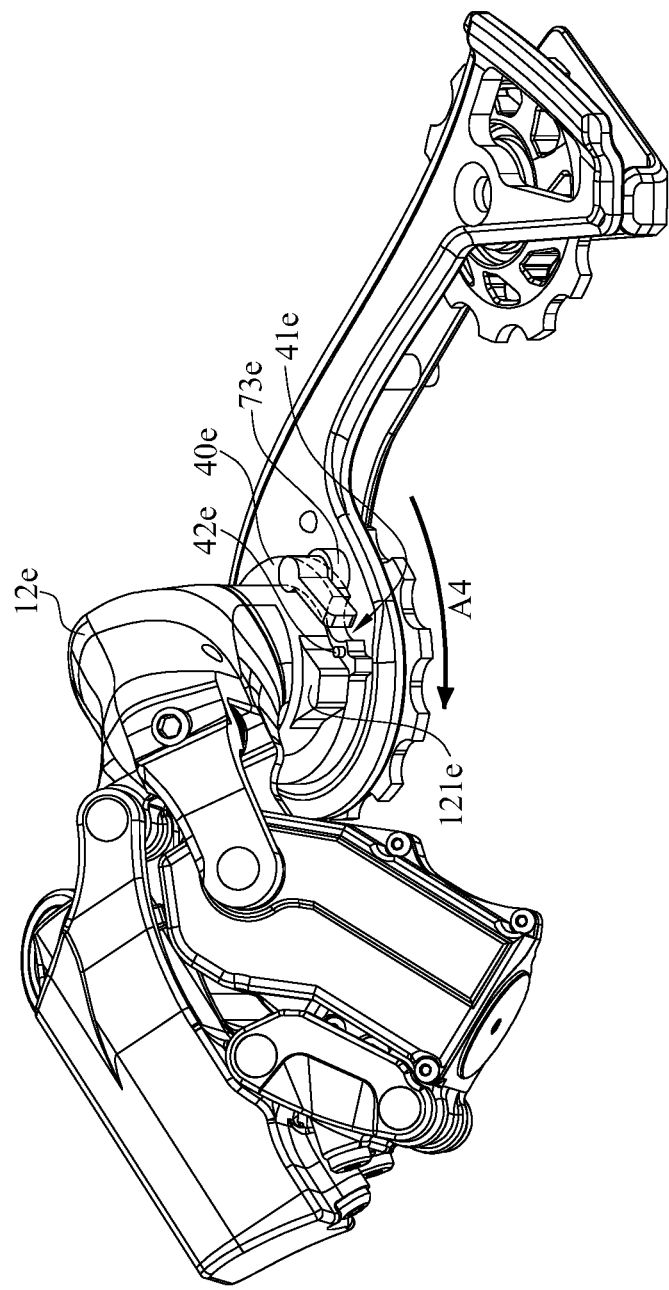
FIG. 20 is a perspective view of the bicycle rear derailleur in FIG. 16 when a positioning post is in contact with a stopper.

Then, please refer to FIG. 20. FIG. 20 is a perspective view of the bicycle rear derailleur in FIG. 16 when a positioning post is in contact with a stopper.

The movable component 12e has a stopper 121e (e.g., a protrusion), and the first assembling component 40e further has a positioning post 42e. During the released state of the locking mechanism 70e (i.e., when the positioning block 73e is detached from the holding slot 41e), the first assembling component 40e is pivoted in the direction A4 by being forced by the first elastic component 50e (shown in FIG. 17). And the positioning post 42e can be stopped by the stopper 121e when the positioning post 42e hits the stopper 121e, such that the first assembling component 40e is held in a position that can still experience the torque provided by the first elastic component 50e.

Figure 21:
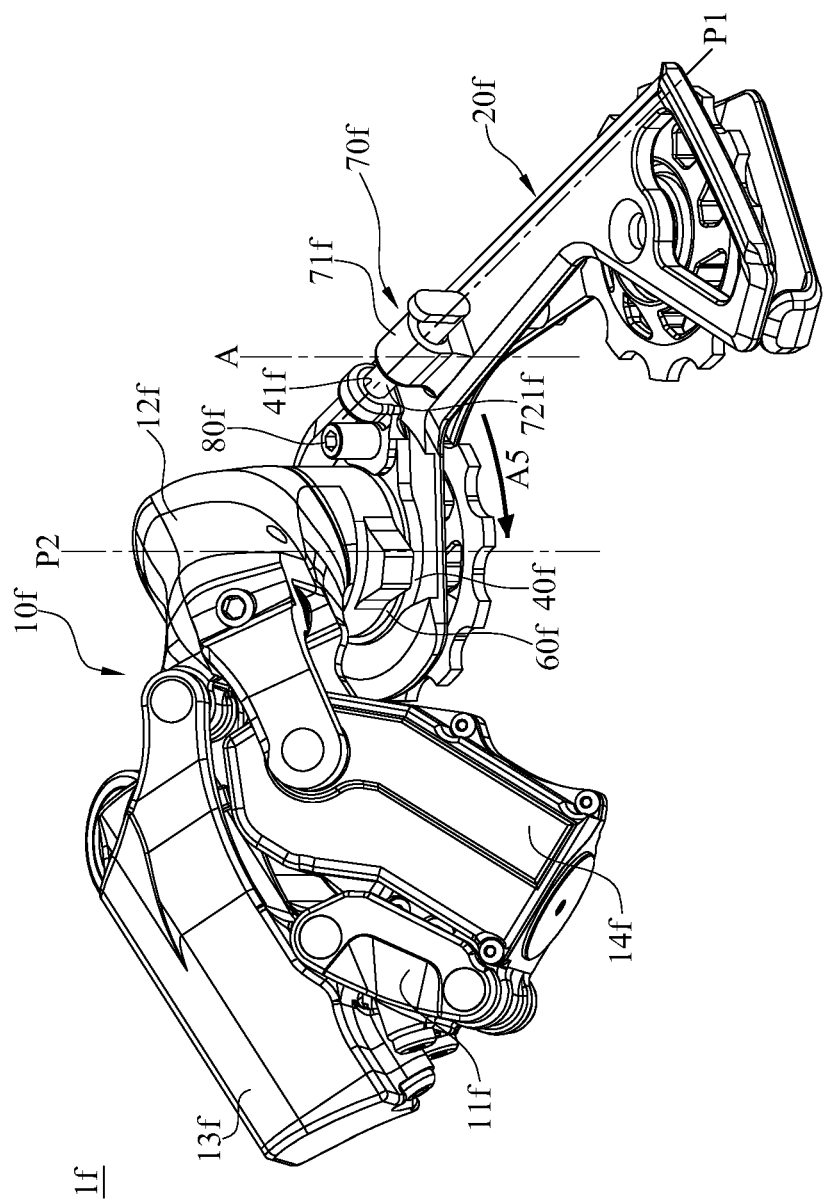
FIG. 21 is a perspective view of a bicycle rear derailleur according a sixth embodiment of this disclosure.
Figure 22:
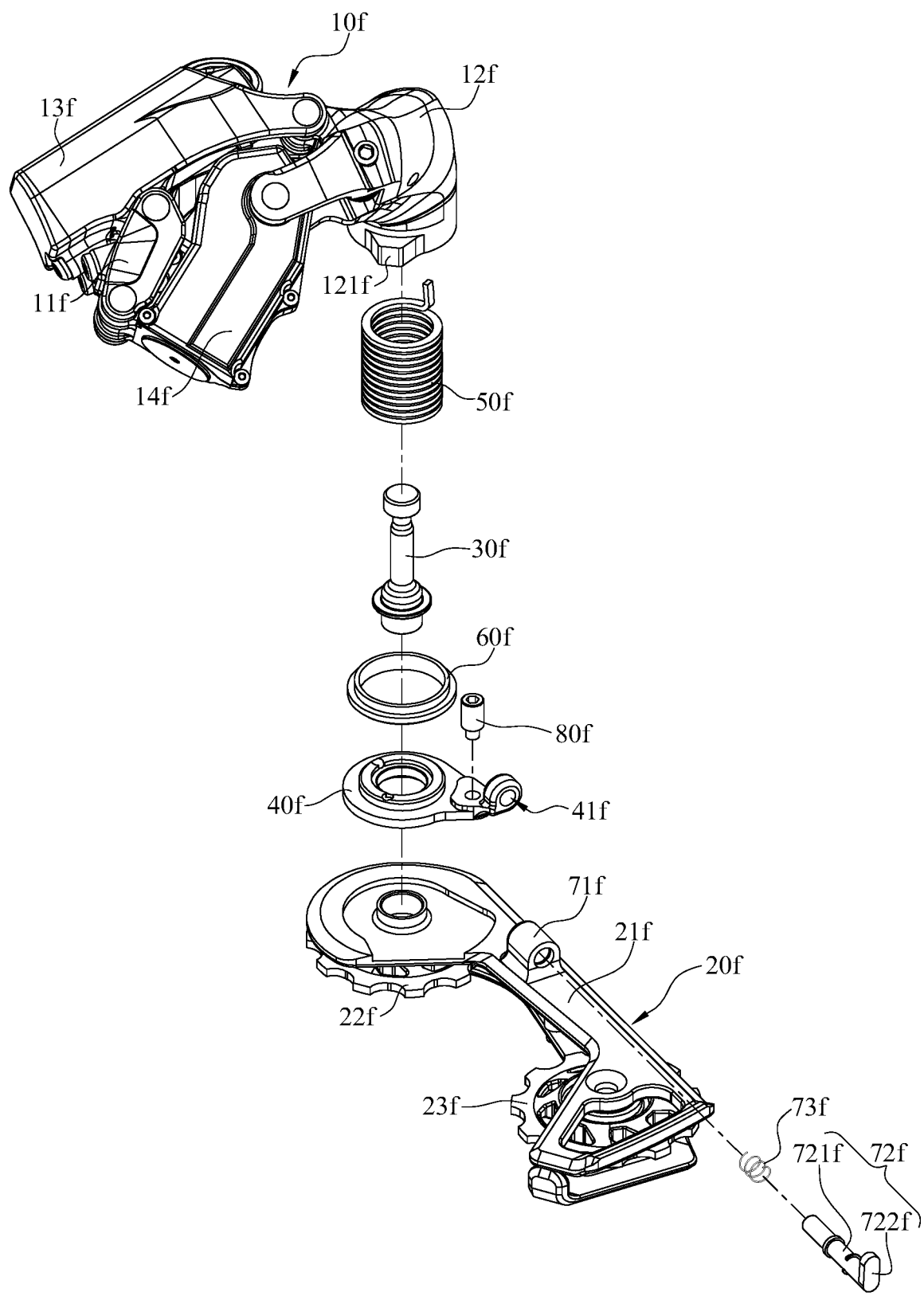
FIG. 22 is an exploded view of the bicycle rear derailleur in FIG. 21.

Please refer to FIG. 21 and FIG. 22. FIG. 21 is a perspective view of a bicycle rear derailleur according a sixth embodiment of this disclosure. FIG. 22 is an exploded view of the bicycle rear derailleur in FIG. 21.

This embodiment provides a bicycle rear derailleur 1f. The bicycle rear derailleur 1f includes a linkage assembly 10f, a chain guiding assembly 20f, a pivot post 30f, a first assembling component 40f, a first elastic component 50f, a washer 60f and a locking mechanism 70f.

The linkage assembly 10f includes a fixed component 11f, a movable component 12f, a first link 13f and a second link 14f. The fixed component 11f is configured to be fixed to a bicycle frame (not shown in figures). Two ends of the first link 13f are respectively pivotably connected to the fixed component 11f and the movable component 12f, and two ends of the second link 14f are respectively pivotably connected to the fixed component 11f and the movable component 12f In this embodiment, the linkage assembly 10f that is consisted of the fixed component 11f, the movable component 12f, the first link 13f and the second link 14f is a four-link mechanism.

The chain guiding assembly 20f includes a frame 21f, a guide pulley 22f and a tension pulley 23f. The guide pulley 22f and the tension pulley 23f are pivotably connected to the frame 21f, and the frame 21f is pivotably connected to the movable component 12f via the pivot post 30f. The guide pulley 22f is configured to guide a bicycle chain (not shown in figures), and the tension pulley 23f is configured to keep tension on the bicycle chain.

The first assembling component 40f is disposed between the frame 21f of the chain guiding assembly 20f and the movable component 12f. Two opposite ends of the first elastic component 50f are respectively fixed to the movable component 12f and the first assembling component 40f and is able to provide a torque to pivot the first assembling component 40f with respect to the movable component 12f in a direction A5 (shown in FIG. 21).

The washer 60f is, for example, a washer. The washer 60f is disposed between the movable component 12f of the linkage assembly 10f and the first assembling component 40f.

The first assembling component 40f has an insertion hole 41f. The locking mechanism 70f includes a connecting part 71f, a fixing post 72f and a second elastic component 73f. The connecting part 71f is fixed on the frame 21f of the chain guiding assembly 20f, and a central axis P1 of the connecting part 71f is perpendicular to a reference line A which is parallels to a rotation axis P2 of the chain guiding assembly 20f. The fixing post 72f includes a shaft portion 721f and a handle portion 722f. The handle portion 722f protrudes from the shaft portion 721f in a radial direction of the shaft portion 721f, and the shaft portion 721f is slidably disposed through the connecting part 71f. The second elastic component 73f is disposed in the connecting part 71f, sleeved on the shaft portion 721f, and located between an inner wall (not numbered) of the connecting part 71f and a flange (not numbered) of the shaft portion 721f so as to force the fixing post 72f to move toward the first assembling component 40f. Accordingly, the locking mechanism 70f has a fixed state and a released state.

As shown in FIG. 21, FIG. 21 shows the locking mechanism 70e is in the fixed state. In such case, the shaft portion 721f of the fixing post 72f is partially inserted into the insertion hole 41f of the first assembling component 40f such that the first assembling component 40f and the chain guiding assembly 20f are engaged with each other and can be moved together. As such, the first assembling component 40f and the chain guiding assembly 20f can be pivoted together during the fixed state of the locking mechanism 70f.

Figure 23:
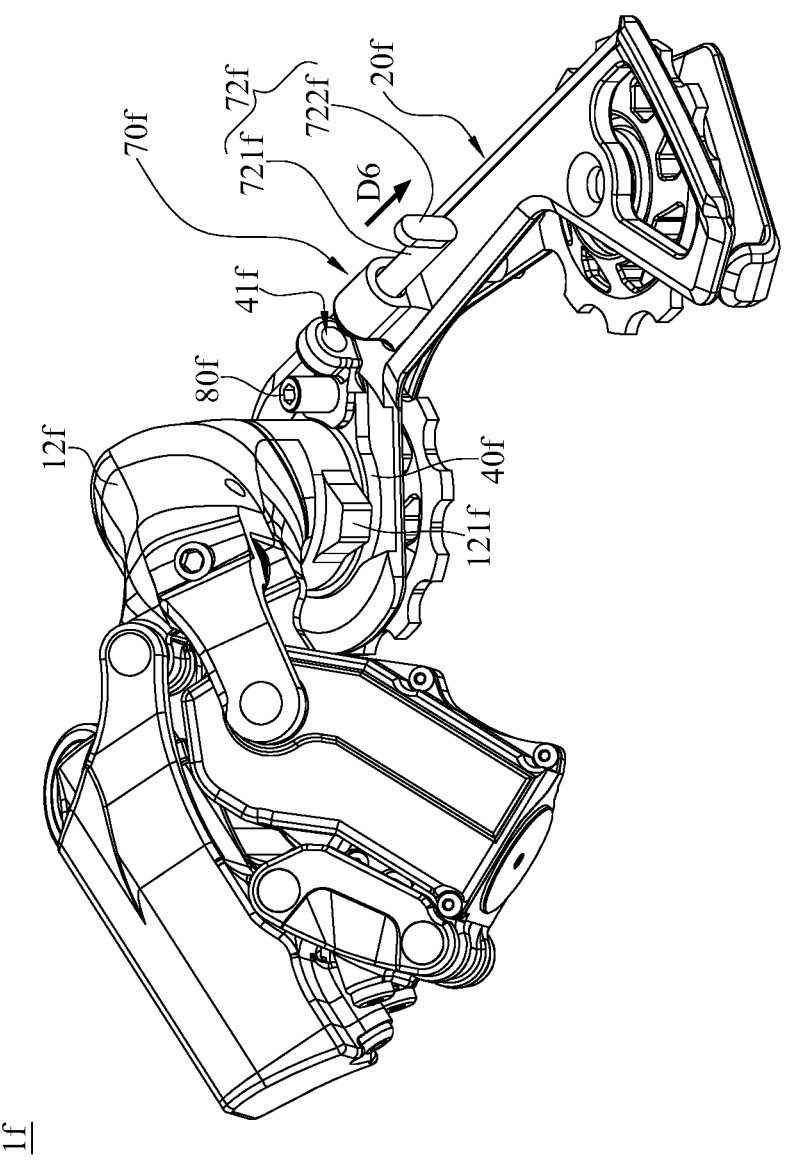
FIG. 23 is a perspective view of the bicycle rear derailleur in FIG. 21 when a shaft portion of a fixing post is detached from an insertion hole.

Then please refer to FIG. 23. FIG. 23 is a perspective view of the bicycle rear derailleur in FIG. 21 when a shaft portion of a fixing post is detached from an insertion hole.

The handle portion 722f is moved in a direction D6 by single hand to pull the shaft portion 721f out of insertion hole 41f such that the locking mechanism 70f is switched to the released state. By doing so, the first assembling component 40f is disengaged from the chain guiding assembly 20f so that the torque provided by the first elastic component 50f (shown in FIG. 22) to the first assembling component 40f is not able to be delivered to the chain guiding assembly 20f. As a result, the chain guiding assembly 20f may pivot in a direction opposite to the direction A5 (e.g., in FIG. 21) due to the gravity and cause the bicycle chain to go slack. In such a case, it becomes easy to detach the bicycle chain from the bicycle rear derailleur 1f or to detach the bicycle rear derailleur 1f from the bicycle frame. In short, the bicycle rear derailleur 1f makes the removal of the bicycle chain or the bicycle rear derailleur convenient and easy.

Figure 24:
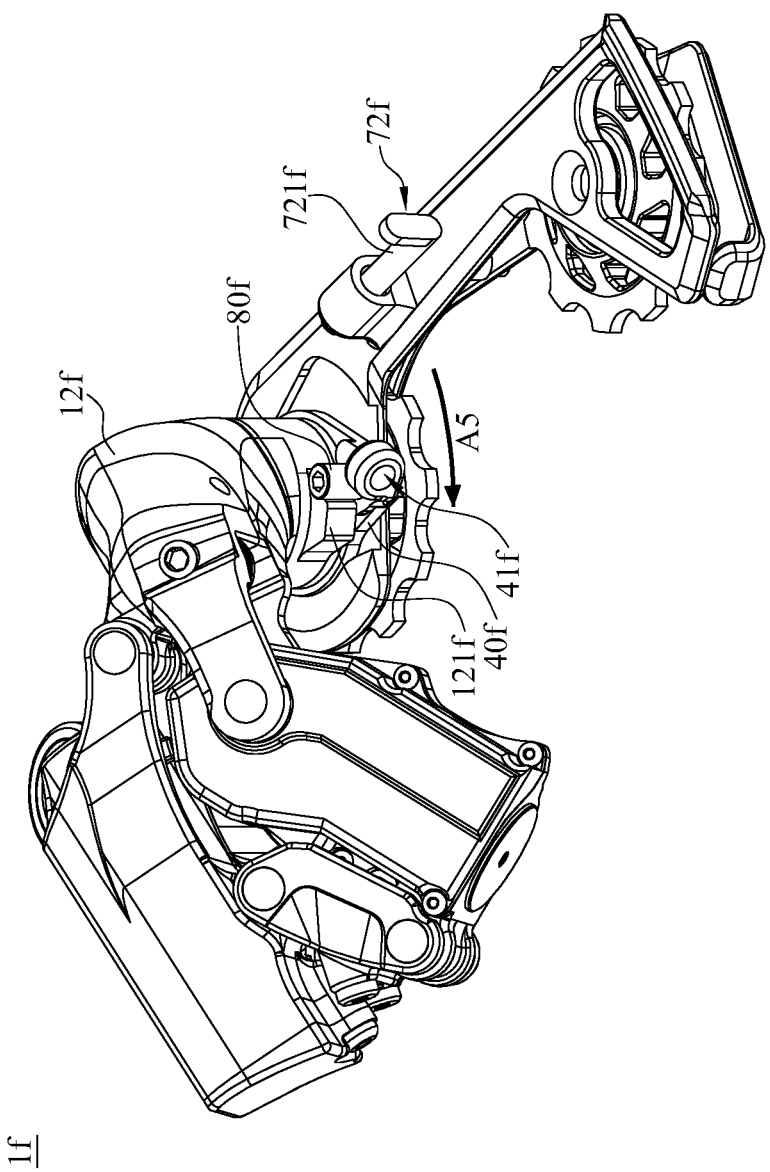
FIG. 24 is a perspective view of the bicycle rear derailleur in FIG. 21 when a positioning post is in contact with a stopper.

Then, please refer to FIG. 24. FIG. 24 is a perspective view of the bicycle rear derailleur in FIG. 21 when a positioning post is in contact with a stopper.

The bicycle rear derailleur 1f further includes a positioning post 80f fixed on the first assembling component 40f, and the movable component 12f has a stopper 121f (e.g., a protrusion). During the released state of the locking mechanism 70f (i.e., when the shaft portion 721f of the fixing post 72f is detached from the insertion hole 41f), the first assembling component 40f is pivoted in the direction A5 by being forced by the first elastic component 50f (shown in FIG. 22). And the positioning post 80f can be stopped by the stopper 121f when the positioning post 80f hits the stopper 121f, such that the first assembling component 40f is held in a position that can still experience the torque provided by the first elastic component 50f.

According to the bicycle rear derailleur as discussed above, the torque applied on the chain guiding assembly can be removed by simply operating the locking mechanism by one hand, which is convenient for the bicycle rear derailleur being removed and the removal of a bicycle chain.

In addition, the incorporation of the positioning post (or connecting part) and the stopper ensures that there still has a certain amount of torque on the first assembling component during the released state of the locking mechanism.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle rear derailleur, adapted to be fixed to a bicycle frame and to guide a bicycle chain, comprising:
   a linkage assembly comprising:
       a fixed component configured to be fixed on the bicycle frame;
       a movable component; and
       a first link, two ends of the first link respectively pivotably connected to the fixed component and the movable component; and
       a second link, two ends of the second link respectively pivotably connected to the fixed component and the movable component;
   a chain guiding assembly pivotably connected to the movable component and configured to guide the bicycle chain;
   a first assembling component pivotably connected to the movable component and disposed between the chain guiding assembly and the movable component;
   a first elastic component, two opposite ends of the first elastic component respectively fixed to the movable component and the first assembling component so as to provide a torque that allows the first assembling component to be pivotable with respect to the movable component; and
   a locking mechanism having a fixed state and a released state;
   wherein when the locking mechanism is in the fixed state, the locking mechanism allows the chain guiding assembly and the first assembling component to be moved together; when the locking mechanism is in the released state, the locking mechanism allows the first assembling component to be pivotable with respect to the chain guiding assembly.

2. The bicycle rear derailleur according to claim 1, wherein when the locking mechanism is in the fixed state, the locking mechanism engages with both the chain guiding assembly and the first assembling component; and when the locking mechanism is in the released state, the locking mechanism disengages the first assembling component from the chain guiding assembly.

3. The bicycle rear derailleur according to claim 2, wherein the chain guiding assembly has an insertion hole, the locking mechanism comprises a connecting part, a fixing post and an second elastic component, the connecting part is disposed on the first assembling component, the fixing post is slidably disposed through the connecting part, the second elastic component is disposed in the connecting part so as to provide a force that forces the fixing post to move toward the chain guiding assembly; when the locking mechanism is in the fixed state, the fixing post is partially inserted into the insertion hole; and when locking mechanism is in the released state, the fixing post is removed from the insertion hole.

4. The bicycle rear derailleur according to claim 3, wherein the connecting part is detachably mounted on the first assembling component.

5. The bicycle rear derailleur according to claim 3, wherein the movable component has a stopper, and the stopper is configured to stop a movement of the connecting part.

6. The bicycle rear derailleur according to claim 3, wherein the connecting part is inseparably fixed to the first assembling component.

7. The bicycle rear derailleur according to claim 3, further comprising a positioning post, and the movable component having a stopper, wherein the positioning post is fixed on the first assembling component, and the stopper is configured to stop a movement of the positioning post.

8. The bicycle rear derailleur according to claim 2, wherein the first assembling component has a holding slot, and the locking mechanism comprises a pivot, a positioning block and a handle, two opposite ends of the position block are respectively connected to the pivot and the handle, the pivot is pivotably connected to the chain guiding assembly; the handle is pivotable so as to move the locking mechanism between the fixed state and the released state; when the locking mechanism is in the fixed state, the positioning block is located in the holding slot; when the locking mechanism is in the released state, the positioning block is removed from the holding slot.

9. The bicycle rear derailleur according to claim 8, further comprising a positioning post, wherein the positioning post is pressably disposed on the chain guiding assembly, and the positioning post is configured to stop a movement of the handle so as to hold the locking mechanism to be in the fixed state.

10. The bicycle rear derailleur according to claim 9, wherein the positioning post is a spring plunger.

11. The bicycle rear derailleur according to claim 8, wherein the movable component has a stopper, the first assembling component has a positioning post, and the stopper is configured to stop a movement of the positioning post.

12. The bicycle rear derailleur according to claim 2, wherein the first assembling component has an insertion hole, the locking mechanism comprises a connecting part, a fixing post and a second elastic component, the connecting part is fixed on the chain guiding assembly, the fixing post is slidably disposed through the connecting part, the second elastic component is disposed in the connecting part so as to provide a force that forces the fixing post to move toward the first assembling component; when the locking mechanism is in the fixed state, the fixing post is partially inserted into the insertion hole; and when the locking mechanism is in the released state, the fixing post is removed from the insertion hole.

13. The bicycle rear derailleur according to claim 12, wherein a central axis of the connecting part is perpendicular to a rotation axis of the chain guiding assembly.

14. The bicycle rear derailleur according to claim 12, wherein the fixing post comprises a shaft portion and a handle portion, the handle portion protrudes from the shaft portion in a radial direction of the shaft portion, and the shaft portion is rotatably disposed through the connecting part.

15. The bicycle rear derailleur according to claim 12, further comprising a positioning post, and the movable component having a stopper, wherein the positioning post is fixed on the first assembling component, and the stopper is configured to stop a movement of the positioning post.

16. The bicycle rear derailleur according to claim 1, further comprising a second assembling component, wherein the second assembling component is disposed between the first assembling component and the movable component, the second assembling component and the chain guiding assembly are engaged with each other so that the chain guiding assembly and the second assembling component are movable together; when the locking mechanism is in the fixed state, the locking mechanism is disposed through the second assembling component and engaged with the first assembling component so as to allow the second assembling component and the first assembling component to be moved together; and when the locking mechanism is in the released state, the locking mechanism disengages the first assembling component from the second assembling component so that the first assembling component is pivotable with respect to the second assembling component.

17. The bicycle rear derailleur according to claim 16, wherein the first assembling component has an insertion hole, the locking mechanism comprises a connecting part, a fixing post and a second elastic component, the connecting part is fixed on the second assembling component, the fixing post is disposed through the connecting part, the second elastic component is disposed in the connecting part so as to provide a force that forces the fixing post to move toward the first assembling component; when the locking mechanism is in the fixed state, the fixing post is partially inserted into the insertion hole; and when the locking mechanism is in the released state, the fixing post is removed from the insertion hole.

18. The bicycle rear derailleur according to claim 16, further comprising a positioning post, and the movable component having a stopper, wherein the positioning post is fixed on the first assembling component, and the stopper is configured to stop a movement of the positioning post.

19. The bicycle rear derailleur according to claim 16, wherein the chain guiding assembly has a first engagement structure, and the second assembling component has a second engagement structure, and the first engagement structure and the second engagement structure are engaged with each other.

20. The bicycle rear derailleur according to claim 19, wherein the first engagement structure is a block, and the second engagement structure comprises two teeth, the two teeth form a slot therebetween, and the first engagement structure is located in the slot and clamped by the two teeth.

21. The bicycle rear derailleur according to claim 19, wherein the first engagement structure comprises two teeth, and the two teeth form a slot therebetween, the second engagement structure is a block, the second engagement structure is located in the slot and clamped by the two teeth.

22. The bicycle rear derailleur according to claim 1, further comprising a washer disposed between the movable component and the first assembling component.

* * * * *